US012596485B2

(12) United States Patent　(10) Patent No.: US 12,596,485 B2
Park et al.　(45) Date of Patent:　Apr. 7, 2026

(54) HOST DEVICE GENERATING BLOCK MAP INFORMATION, METHOD OF OPERATING THE SAME, AND METHOD OF OPERATING ELECTRONIC DEVICE INCLUDING THE SAME

(71) Applicant: Samsung Electronics Co., Ltd., Suwon-si (KR)

(72) Inventors: Daejun Park, Suwon-si (KR); Seokhwan Kim, Suwon-si (KR); Yonggil Song, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 128 days.

(21) Appl. No.: 18/433,939

(22) Filed: Feb. 6, 2024

(65) Prior Publication Data

US 2025/0077091 A1　　Mar. 6, 2025

(30) Foreign Application Priority Data

Sep. 4, 2023　(KR) ........................ 10-2023-0117249

(51) Int. Cl.
G06F 3/06　　　(2006.01)
(52) U.S. Cl.
CPC .......... G06F 3/0619 (2013.01); G06F 3/0631 (2013.01); G06F 3/064 (2013.01); G06F 3/067 (2013.01)
(58) Field of Classification Search
CPC ...... G06F 3/0619; G06F 3/0631; G06F 3/064; G06F 3/067; G06F 3/0644; G06F 3/0679;

G06F 3/0614; G06F 3/0608; G06F 3/0604; G06F 12/0253; G06F 2212/1016; G06F 2212/1044; G06F 2212/7205; G06F 2212/7211
See application file for complete search history.

(56) References Cited

U.S. PATENT DOCUMENTS

| 10,089,031 B2 | 10/2018 | Seo et al. |
| 11,221,945 B2 | 1/2022 | Hattori |
| | (Continued) | |

FOREIGN PATENT DOCUMENTS

| JP | 2022-179798 A | 12/2022 |
| WO | 2022/072993 A1 | 4/2022 |

OTHER PUBLICATIONS

Kyuhwa Han et al., ZNS+: Advanced Zoned Namespace Interface for Supporting In-Storage Zone Compaction, 15th USENIX Symposium on Operating Systems Design and Implementation, USENIX Association, 2021, p. 147-162.

*Primary Examiner* — Jason W Blust
(74) *Attorney, Agent, or Firm* — Harness, Dickey & Pierce, P.L.C.

(57)　　　ABSTRACT
Disclosed is an electronic device which includes a host device and a storage device. A method of operating the electronic device includes performing, by the host device, a validity check operation of a target host zone among a plurality of host zones supporting a sequential write operation, generating, by the host device, block map information of the target host zone based on the validity check operation, the block map information including identification information of the target host zone and validity information of all data blocks in the target host zone, and sending, by the host device, the block map information to the storage device.

18 Claims, 12 Drawing Sheets

(56) References Cited

U.S. PATENT DOCUMENTS

| | | |
|---|---|---|
| 11,366,611 B2 | 6/2022 | Byun |
| 11,422,942 B2 | 8/2022 | Byun et al. |
| 11,543,986 B2 | 1/2023 | Kang |
| 2021/0089217 A1* | 3/2021 | Bjørling .............. G06F 11/2094 |
| 2021/0103394 A1 | 4/2021 | Rho et al. |
| 2022/0138099 A1 | 5/2022 | Kang |
| 2023/0051806 A1* | 2/2023 | Karkra ................. G06F 3/0665 |
| 2023/0266897 A1 | 8/2023 | Bert |
| 2024/0143211 A1* | 5/2024 | Na ........................ G06F 3/0644 |

* cited by examiner

Start

S110
Perform a validity check operation of a target host zone

S120
Update metadata of the target host zone

S130
At least some BLKs of the target host zone are valid?

No

S140
Generate BMI of the target host zone

S150
Provide BMI to a storage device

S160
Provide a reset request of the target host zone

Yes

End

HOST DEVICE GENERATING BLOCK MAP INFORMATION, METHOD OF OPERATING THE SAME, AND METHOD OF OPERATING ELECTRONIC DEVICE INCLUDING THE SAME

CROSS-REFERENCE TO RELATED APPLICATIONS

This application claims priority under 35 U.S.C. § 119 to Korean Patent Application No. 10-2023-0117249 filed on Sep. 4, 2023, in the Korean Intellectual Property Office, the disclosures of which are incorporated by reference herein in their entireties.

BACKGROUND

Example embodiments of the present inventive concepts described herein relate to data management, and more particularly, relate to a host device generating block map information, a method of operating the host device, and a method of operating an electronic device including the host device.

A memory device stores data in response to a write request and outputs data stored therein in response to a read request. For example, the memory device is classified as a volatile memory device, which loses data stored therein when a power is turned off, such as a dynamic random access memory (DRAM) device or a static RAM (SRAM) device, or a non-volatile memory device, which retains data stored therein even when a power is turned off, such as a flash memory device, a phase-change RAM (PRAM), a magnetic RAM (MRAM), or a resistive RAM (RRAM).

A host device may store data in the memory device, read the stored data, and delete the stored data. The host device may allocate a zone supporting a sequential write for the purpose of efficiently managing data. In the zone, a valid data block may be changed to an invalid data block depending on a request of the user or an operating policy of the host device. When a storage device does not receive validity information of a data block from the host device, the storage device may perform an unnecessary reliability operation with respect to the invalid data block, thereby causing the waste of the storage space. Accordingly, it may be required or advantageous to provide an interface that allows the host device to share the validity information of the data block with the storage device.

SUMMARY

Example embodiments of the present inventive concepts provide a host device generating block map information, a method of operating the host device, and a method of operating an electronic device including the host device.

According to some example embodiments, an electronic device may include a host device and a storage device. A method of operating the electronic device including a host device and a storage device comprising performing, by the host device, a validity check operation of a target host zone among a plurality of host zones supporting a sequential write operation, generating, by the host device, block map information of the target host zone based on the validity check operation, the block map information including identification information of the target host zone and validity information of all data blocks in the target host zone, and sending, by the host device, the block map information to the storage device.

According to some example embodiments, a host device may communicate with a storage device. A method of operating the host device which communicates with a storage device comprising performing a validity check operation of a target host zone among a plurality of host zones supporting a sequential write operation, generating block map information of the target host zone based on the validity check operation, the block map information including identification information of the target host zone and validity information of all data blocks in the target host zone, and sending the block map information to the storage device.

According to some example embodiments, a host device comprises a first processing circuitry configured to manage a plurality of host zones, and a second processing circuitry configured to send validity data information to the first processing circuitry based on a validity check operation of a target host zone among the plurality of host zones, the first processing circuitry configured to generate block map information of the target host zone based on the validity data information, and send the block map information to an external storage device, the block map information including identification information of the target host zone and validity information of all data blocks in the target host zone.

BRIEF DESCRIPTION OF THE DRAWINGS

The above and other objects and features of the present inventive concepts will become apparent by describing in detail some example embodiments thereof with reference to the accompanying drawings.

FIG. 6 is a diagram describing a method of operating a conventional electronic device managing a single storage zone mapped to a host zone according to some example embodiments.

FIG. 7 is a diagram describing a method of operating an electronic device managing a single storage zone mapped to a host zone, according to some example embodiments.

DETAILED DESCRIPTION

Figure 1:
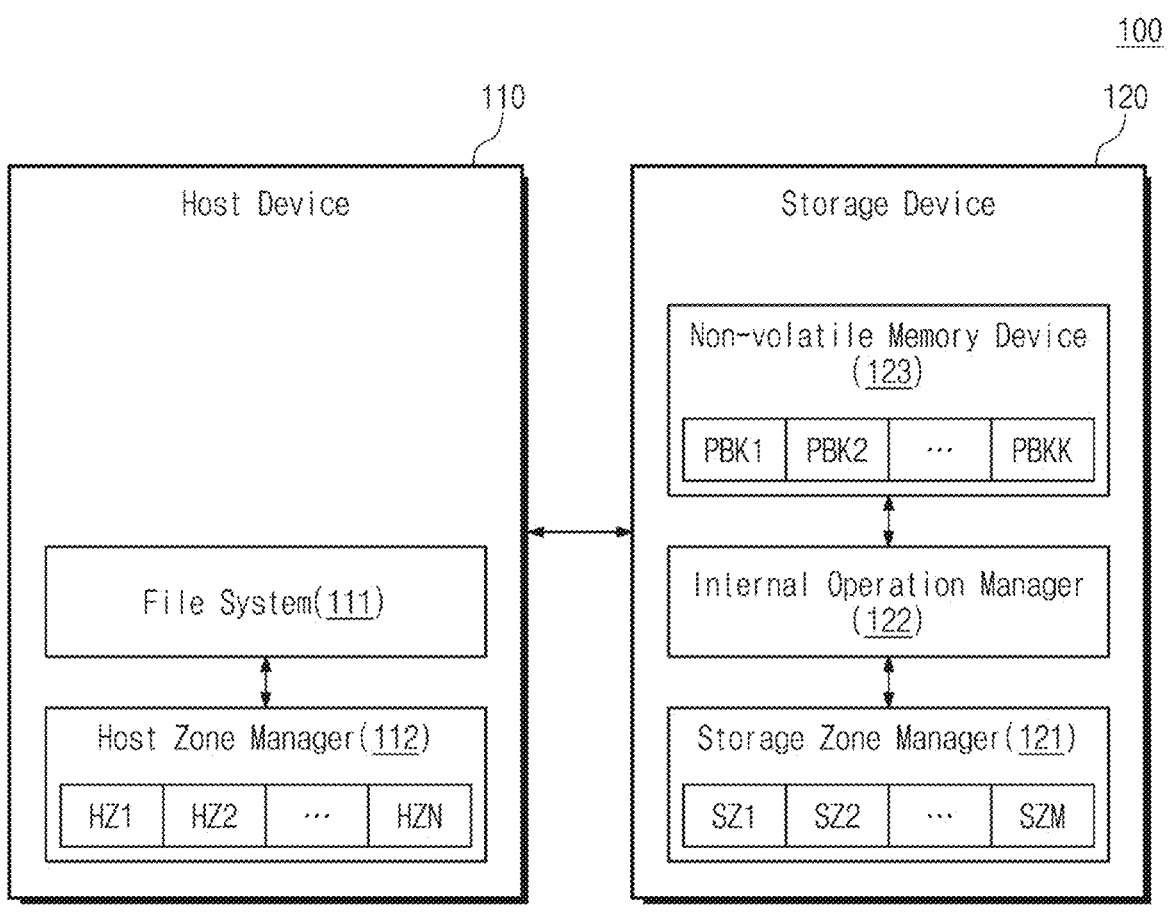
FIG. 1 is a block diagram of an electronic device according to some example embodiments.

The present inventive concepts will be described more fully hereinafter with reference to the accompanying drawings, in which some example embodiments of the present inventive concepts are shown. As those skilled in the art would realize, the described example embodiments may be modified in various different ways, all without departing from the spirit or scope of the present inventive concepts.

Accordingly, the drawings and descriptions are to be regarded as illustrative in nature and not restrictive. Like reference numerals designate like elements throughout the specification. The sequence of operations or steps are not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

Components described in the detailed description with reference to terms "part," "unit," "module," "layer," etc., and function blocks illustrated in drawings may be implemented in the form of software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a MEMS (microelectromechanical system), a passive element, or a combination thereof.

FIG. 1 is a block diagram of an electronic device according to some example embodiments. Referring to FIG. 1, an electronic device 100 may include a host device 110 and a storage device 120. In some example embodiments, the electronic device 100 may be a computing system configured to process or store a variety of information. For example, the electronic device 100 may be implemented with a personal computer (PC), a notebook, a laptop, a server, a workstation, a tablet PC, a smartphone, a digital camera, a black box, etc., but example embodiments are not limited thereto.

The host device 110 may control an overall operation of the electronic device 100. The host device 110 may communicate with the storage device 120. For example, the host device 110 may store data in the storage device 120, may read data stored in the storage device 120, or may delete data stored in the storage device 120.

In some example embodiments, the host device 110 and the storage device 120 may communicate with each other through a zone-based interface. The zone-based interface may use a zone supporting a sequential write. The zone managed through the zone-based interface may be referred to as a "host zone." A plurality of data blocks in the host zone may sequentially store data. The host zone may be a logical space that refers to a set of a plurality of data blocks in which the sequentiality (e.g., an order) is guaranteed. The host zone may be internally mapped to at least one storage zone in the storage device 120.

The host device 110 may include a file system 111 and a host zone manager 112. The file system 111 and the host zone manager 112 may be implemented with hardware, software, or a combination of hardware and software.

For example, at least some functions or operations of the file system 111 and the host zone manager 112 may be implemented by software. The functions or operations implemented by software may be stored in a non-transitory computer-readable medium as an instruction or instruction code. A processor or processing circuitry of the host device 110 may execute the instructions or instruction code stored in the non-transitory computer-readable medium such that the host device 110 performs the functions or operations corresponding to the instructions or instruction code.

The file system 111 may manage a file in response to a system request of an application. The file may correspond to data blocks of host zones HZ1 to HZN that are managed by the host device 110. Herein, "N" is an arbitrary natural number. The file system 111 may update data in the data blocks of the host zones HZ1 to HZN by generating a file, changing a file, or deleting a file, but example embodiments are not limited thereto.

The file system 111 may perform a validity check operation of a data block based on file management (e.g., based on file management functions or operations). The validity check operation may be performed to check whether each of the data blocks of the host zones HZ1 to HZN is valid or invalid. The file system 111 may provide validity data information to the host zone manager 112 based on the validity check operation. The validity data information may indicate whether each of the data blocks of the host zones HZ1 to HZN is valid.

The host zone manager 112 may manage the plurality of host zones HZ1 to HZN. Each of the plurality of host zones HZ1 to HZN may include a plurality of data blocks. For example, a data block may store at least a portion of data corresponding to a file that is managed by the file system 111.

The host zone manager 112 may receive the validity data information from the file system 111. The host zone manager 112 may generate block map information of a target host zone among the plurality of host zones HZ1 to HZN based on the validity data information.

The block map information may include identification information of the target host zone and validity information of all the data blocks in the target host zone. For example, identification information may include a host index value for identifying the target host zone among the plurality of host zones HZ1 to HZN. For example, validity information may include a series of validity values respectively corresponding to all the data blocks of the target host zone, and each validity value may indicate whether the corresponding data block of the target host zone is valid. In some example embodiments, when the corresponding data block is valid, each of the series of validity values may have a first bit value (e.g., "1"), when the corresponding data block is invalid, each of the series of validity values may have a second bit value (e.g., "0").

In some example embodiments, the host zone manager 112 may be implemented as a part of the file system 111, may be implemented as a part of a device driver that communicates with the storage device 120 under control of the file system 111, may be implemented with a separate hardware device, or may be implemented by separate processing circuitry including a software module, but example embodiments are not limited thereto.

The storage device 120 may communicate with the host device 110. For example, the storage device 120 may store data from the host device 110 (e.g., data sent from the host device 110 to the storage device 120 and received by the storage device 120), may provide, send, or transmit the stored data to the host device 110, or may delete the stored data in response to a request received from the host device 110.

The storage device 120 may include a storage zone manager 121, an internal operation manager 122, and a non-volatile memory device 123. The storage zone manager 121 and the internal operation manager 122 may be implemented as a part of a storage controller, for example, may be implemented with hardware, software, or a combination of hardware and software.

The storage zone manager 121 may manage a plurality of storage zones SZ1 to SZM. Herein, "M" is an arbitrary natural number. Each of the plurality of host zones HZ1 to HZN may be mapped to arbitrary storage zones among the plurality of storage zones SZ1 to SZM depending on a mapping ratio. For example, the mapping ratio may indicate the number of storage zones mapped to one host zone. The mapping ratio may be a natural number more than or equal to 1. Each of the plurality of storage zones SZ1 to SZM may be mapped to arbitrary physical memory blocks among a plurality of physical memory blocks PBK1 to PBKK of the non-volatile memory device 123. Herein, "K" is an arbitrary natural number.

The internal operation manager 122 may perform an internal operation of the storage device 120. The internal operation may perform, or may be configured to perform, additional operations for reliability maintenance, lifetime improvement, optimization, etc., but example embodiments are not limited thereto. In some example embodiments, the internal operation may refer to an operation that is performed independently of the read operation or the write operation of the host device 110. For example, the internal operation may include at least one of an operation of managing distribution information of physical memory blocks mapped to a storage zone, a reclaim operation according to a change of distribution information of physical memory blocks (or according to retention), a wear-leveling operation of a storage zone, a garbage collection operation of a storage zone, etc., but example embodiments are not limited thereto.

In some example embodiments, the internal operation manager 122 may perform the internal operation based on the block map information received from the host device 110. For example, the storage zone manager 121 may receive the block map information of the target host zone among the plurality of host zones HZ1 to HZN from the host device 110. The storage zone manager 121 may provide the internal operation manager 122 with the block map information and metadata of a storage zone mapped to the target host zone. The internal operation manager 122 may perform the internal operation based on the metadata of the storage zone and the block map information. The internal operation will be described in detail with reference to FIGS. 7 and 10.

The non-volatile memory device 123 may include the plurality of physical memory blocks PBK1 to PBKK. The plurality of the physical memory blocks PBK1 to PBKK may store data. For example, the non-volatile memory device 123 may retain data stored therein even when a power is turned off and may be implemented with a flash memory device, a phase-change RAM (PRAM), a magnetic RAM (MRAM), a resistive RAM (RRAM), etc.

Figure 2:
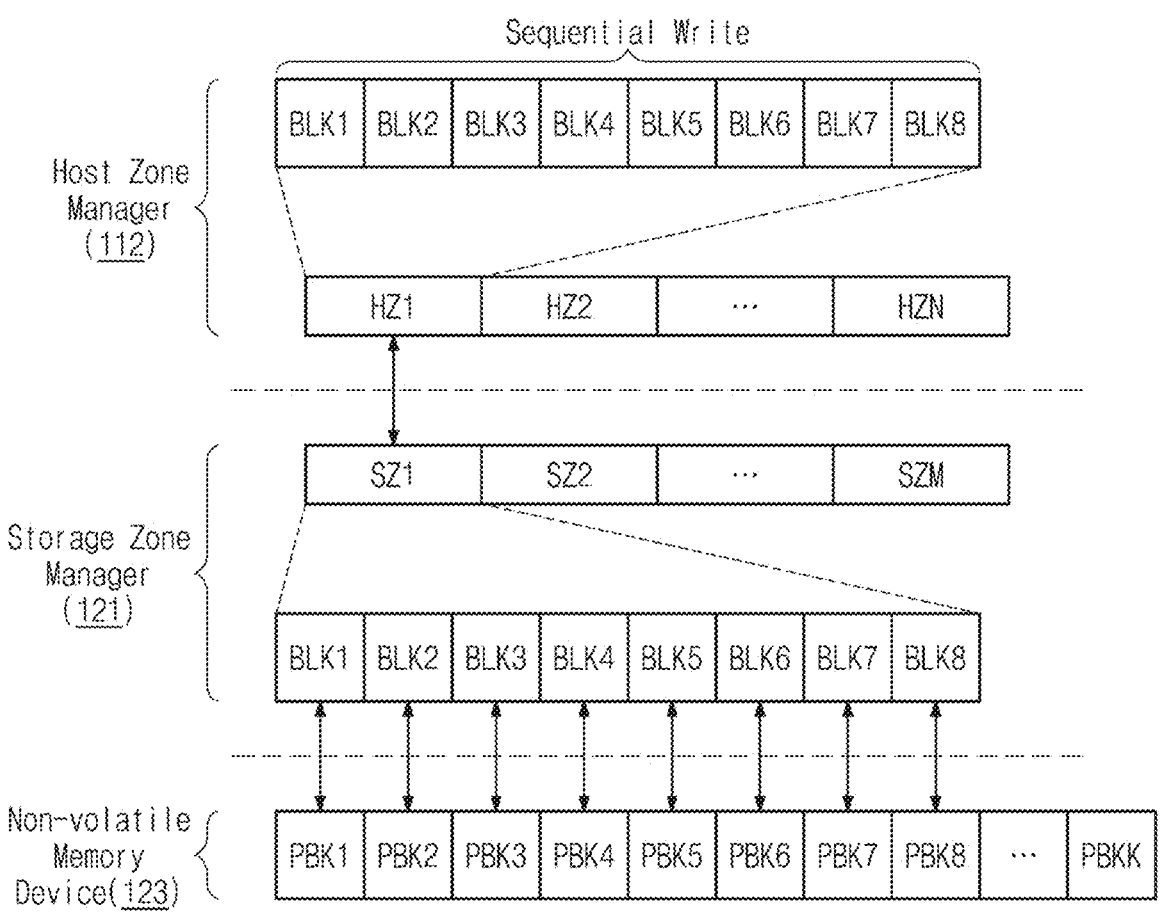
FIG. 2 is a diagram describing a sequential write according to some example embodiments.

FIG. 2 is a diagram describing a sequential write according to some example embodiments. Referring to FIGS. 1 and 2, the host device 110 may include the host zone manager 112. The storage device 120 may include the storage zone manager 121 and the non-volatile memory device 123.

The host zone manager 112 may manage the plurality of host zones HZ1 to HZN. Each of the plurality of host zones HZ1 to HZN may include a plurality of data blocks. For example, the first host zone HZ1 may include first to eighth data blocks BLK1 to BLK8. For better understanding of the present inventive concepts, an example in which the first host zone HZ1 includes eight data blocks is illustrated, but the number of data blocks included in a single host zone is not limited thereto and may be less than, equal to, or more than eight.

The host zone manager 112 may sequentially store data in the host zone. For example, the host zone manager 112 may perform the sequential write (e.g., a sequential write operation) in the first to eighth data blocks BLK1 to BLK8 of the first host zone HZ1. For example, the host zone manager 112 may perform the write operation in the first data block BLK1 of the first host zone HZ1 and may then or subsequently perform the write operation in the second data block BLK2 of the first host zone HZ1.

The storage zone manager 121 may manage the plurality of storage zones SZ1 to SZM. The plurality of host zones HZ1 to HZN may be mapped to the plurality of storage zones SZ1 to SZM. For better understanding of the present inventive concepts, the description will be given as the first host zone HZ1 is mapped to the first storage zone SZ1, but, as one of ordinary skill in the art may understand, the mapping relationship between the host zone and the storage zone may be variously changed and modified. For example, a single host zone may be mapped to plural storage zones (e.g., a single host zone may be mapped to one or more than one storage zone), or the number of storage zones to be mapped for each of the host zones HZ1 to HZN may be differently determined.

The non-volatile memory device 123 may include the plurality of physical memory blocks PBK1 to PBKK. The first to eighth physical memory blocks PBK1 to PBK8 among the plurality of physical memory blocks PBK1 to PBKK may be respectively mapped to the first to eighth data blocks BLK1 to BLK8 of the first storage zone SZ1.

In some example embodiments, the storage zone manager 121 may manage the mapping relationship between the plurality of host zones HZ1 to HZN and the plurality of storage zones SZ1 to SZM. For example, the storage zone manager 121 may store metadata indicating the mapping relationship between the first host zone HZ1 and the first storage zone SZ1. The first to eighth data blocks BLK1 to BLK8 of the first host zone HZ1 may respectively correspond to the first to eighth data blocks BLK1 to BLK8 of the first storage zone SZ1. For example, the sequentiality (e.g., the order), the logical addresses, and the mapping relationship associated with memory blocks of a host zone may be maintained even in memory blocks of at least one storage zone corresponding to the host zone.

In some example embodiments, the storage zone manager 121 may manage the mapping relationship between the plurality of storage zones SZ1 to SZM and the plurality of physical memory blocks PBK1 to PBKK. For example, the storage zone manager 121 may store metadata indicating the mapping relationship between the first to eighth data blocks BLK1 to BLK8 of the first storage zone SZ1 and the first to eighth physical memory blocks PBK1 to PBK8 among the plurality of physical memory blocks PBK1 to PBKK of the non-volatile memory device 123. For example, the storage zone manager 121 may store the mapping relationship (e.g., a logical-to-physical (L2P) mapping relationship) between logical addresses of the first to eighth data blocks BLK1 to BLK8 of the first storage zone SZ1 and physical addresses of the first to eighth physical memory blocks PBK1 to PBK8.

In some example embodiments, because the sequential write operation is performed in the first to eighth data blocks BLK1 to BLK8 of the first storage zone SZ1, the first to eighth physical memory blocks PBK1 to PBK8 of the non-volatile memory device 123 may sequentially store data. For example, the sequentiality (e.g., the order) in the logical zone may be maintained even in the physical zone corresponding to the logical zone.

Figure 3:
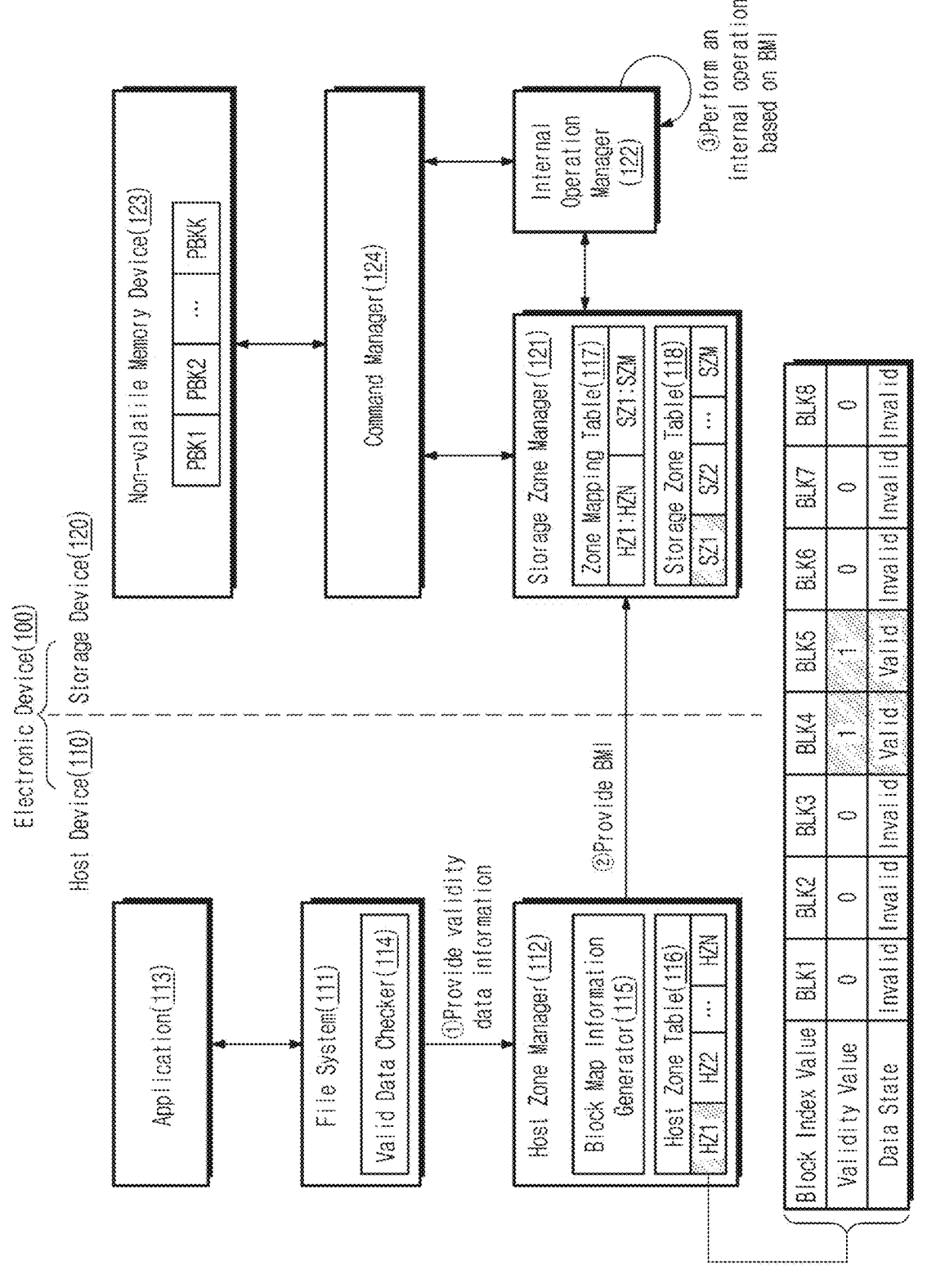
FIG. 3 is a diagram describing a method of operating an electronic device according to some example embodiments.

FIG. 3 is a diagram describing a method of operating an electronic device according to some example embodiments. Referring to FIG. 3, the electronic device 100 may include the host device 110 and the storage device 120.

The host device 110 may include the file system 111, the host zone manager 112, and an application 113. The storage device 120 may include the storage zone manager 121, the internal operation manager 122, the non-volatile memory device 123, and a command manager 124.

The application 113 may generate a system request under control of a user. The application 113 may provide the system request to the file system 111.

The file system 111 may manage a file based on the system request. For example, the file system 111 may update data in data blocks of the plurality of host zones HZ1 to HZN by generating a file based on the system request, changing a file based on the system request, or deleting a file based on the system request, but example embodiments are not limited thereto. The file system 111 may include a valid data checker 114. The valid data checker 114 may perform the validity check operation of the target host zone among the plurality of host zones HZ1 to HZN, based on the update of the data. The valid data checker 114 may generate validity data information based on the validity check operation. In some example embodiments, the valid data checker 114 may provide, transmit, or send the validity data information to the host zone manager 112.

The host zone manager 112 may include a host zone table 116 and a block map information generator 115. The host zone manager 112 may store metadata of the plurality of host zones HZ1 to HZN. The host zone manager 112 may update the metadata of the host zone table 116 based on the validity data information provided from the file system 111. The metadata of the host zone table 116 may include block index values of data blocks corresponding to a host zone and validity values of the data blocks. The validity values may vary depending on data states of data blocks.

For example, the host zone table 116 may include the metadata of the first host zone HZ1. The metadata of the first host zone HZ1 may include index values of the first to eighth data blocks BLK1 to BLK8 corresponding to the first host zone HZ1 and validity values of the first to eighth data blocks BLK1 to BLK8. The validity values of the first to eighth data blocks BLK1 to BLK8 may change depending on data states of the first to eighth data blocks BLK1 to BLK8. For example, when a data block is valid, a validity value corresponding to the data block may have a first bit value (e.g., "1"), when the data block is invalid, the validity value corresponding to the data block may have a second bit value (e.g., "0").

The block map information generator 115 of the host zone manager 112 may generate block map information BMI with reference to the updated data of the host zone table 116. The block map information BMI may include identification information of the target host zone and validity information of all the data blocks in the target host zone.

For example, the target host zone may be the first host zone HZ1 among the plurality of host zones HZ1 to HZN. The block map information generator 115 may generate the block map information BMI including the identification information and the validity information. The identification information may include a host index value for identifying the first host zone HZ1 among the plurality of host zones HZ1 to HZN. The validity information may include a series of validity values indicating whether the first to eighth data blocks BLK1 to BLK8 being all the data blocks of the first host zone HZ1 are valid. Each of the series of validity values may have the first bit value when the corresponding data block is valid and may have the second bit value when the corresponding data block is invalid.

The storage zone manager 121 may include a zone mapping table 117 and a storage zone table 118. The zone mapping table 117 may store mapping information of the plurality of host zones HZ1 to HZN and the plurality of storage zones SZ1 to SZM. For example, the zone mapping table 117 may store mapping information of the first host zone HZ1 and the first storage zone SZ1. The storage zone table 118 may store metadata of the plurality of storage zones SZ1 to SZM. For example, metadata of a storage zone may include a write pointer (WP) in the storage zone, validity information of a data block, a physical address (or L2P mapping information) of a physical memory block mapped to the data block, etc. The write pointer may indicate an address of a data block of a storage zone, in which the sequential write is to be performed.

The storage zone manager 121 may search for a storage zone corresponding to the target host zone based on the block map information BMI from the host zone manager 112, may update metadata of the found storage zone, and may provide the updated metadata and the block map information BMI to the internal operation manager 122.

The internal operation manager 122 may perform the internal operation based on the updated metadata of the storage zone and the block map information BMI.

The command manager 124 may communicate with the storage zone manager 121, the internal operation manager 122, and the non-volatile memory device 123. The command manager 124 may perform the internal operation in the non-volatile memory device 123 under control of the internal operation manager 122. The command manager 124 may perform a reset operation (e.g., an operation of deleting all the data in a zone and deleting the write pointer) in the non-volatile memory device 123 under control of the storage zone manager 121. As well as the internal operation and the reset operation, in some example embodiments, the command manager 124 may also perform the read operation, the write operation, and the erase operation of data based on the request from the file system 111 and communication with the storage zone manager 121.

The non-volatile memory device 123 may include the plurality of physical memory blocks PBK1 to PBKK. The plurality of physical memory blocks PBK1 to PBKK may be mapped to the plurality of storage zones SZ1 to SZM. The mapping relationship between the plurality of physical memory blocks PBK1 to PBKK and the plurality of storage zones SZ1 to SZM may be managed by the storage zone manager 121 in the storage zone table 117 as the metadata.

Below, a method of operating the electronic device 100 that generates the block map information BMI will be described.

In a first operation ①, the file system 111 may perform the validity check operation depending on the system request of the application 113 or an operating policy. The file system 111 may generate validity data information based on the validity check operation. For example, as the data of the target host zone among the plurality of host zones HZ1 to HZN are generated, changed, or deleted, the validity data information may include information about data blocks of the target host zone, which experience a validity change. The file system 111 may provide the validity data information to the host zone manager 112.

In a second operation ②, the host zone manager 112 may generate the block map information BMI of the target host zone based on the validity data information. The block map information BMI may include identification information and validity information. For example, when the first host zone HZ1 is the target host zone, the identification information may include an index value for identifying the first host zone HZ1 among the plurality of host zones HZ1 to HZN. The validity information may include a series of validity values indicating whether the first to eighth data blocks BLK1 to BLK8 of the first host zone HZ1 are valid. The host zone manager 112 may provide the block map information BMI to the storage zone manager 121.

In a third operation ③, the storage zone manager 121 may update metadata of a storage zone corresponding to the target host zone based on the block map information BMI. The metadata of the storage zone may include a write pointer (WP) in the storage zone, validity information of a data block, a physical address of a physical memory block mapped to the data block, etc. The storage zone manager 121 may provide the updated metadata and the block map information BMI to the internal operation manager 122. The internal operation manager 122 may perform the internal operation by controlling the command manager 124 based on the updated metadata and the block map information BMI.

For example, when the first host zone HZ1 is the target host zone and a storage zone mapped to the first host zone HZ1 is the first storage zone SZ1, the internal operation may include at least one of a distribution information management operation of physical memory blocks mapped to the first storage zone SZ1, a reclaim operation according to a change of the distribution information (e.g., the retention) of the physical memory blocks, a wear-leveling operation of the first storage zone SZ1, and a garbage collection operation of the first storage zone SZ1.

As described above, the host device 110 according to some example embodiments of the present inventive concepts may provide the storage device 120 with the block map information BMI indicating whether some data blocks are valid, independently of the reset operation of the host zone. As an interface that enables the sharing of the block map information BMI is added, the storage device 120 may distinguish valid data blocks from invalid data blocks before resetting the host zone, and thus, the internal operation may be efficiently performed.

Figure 4:
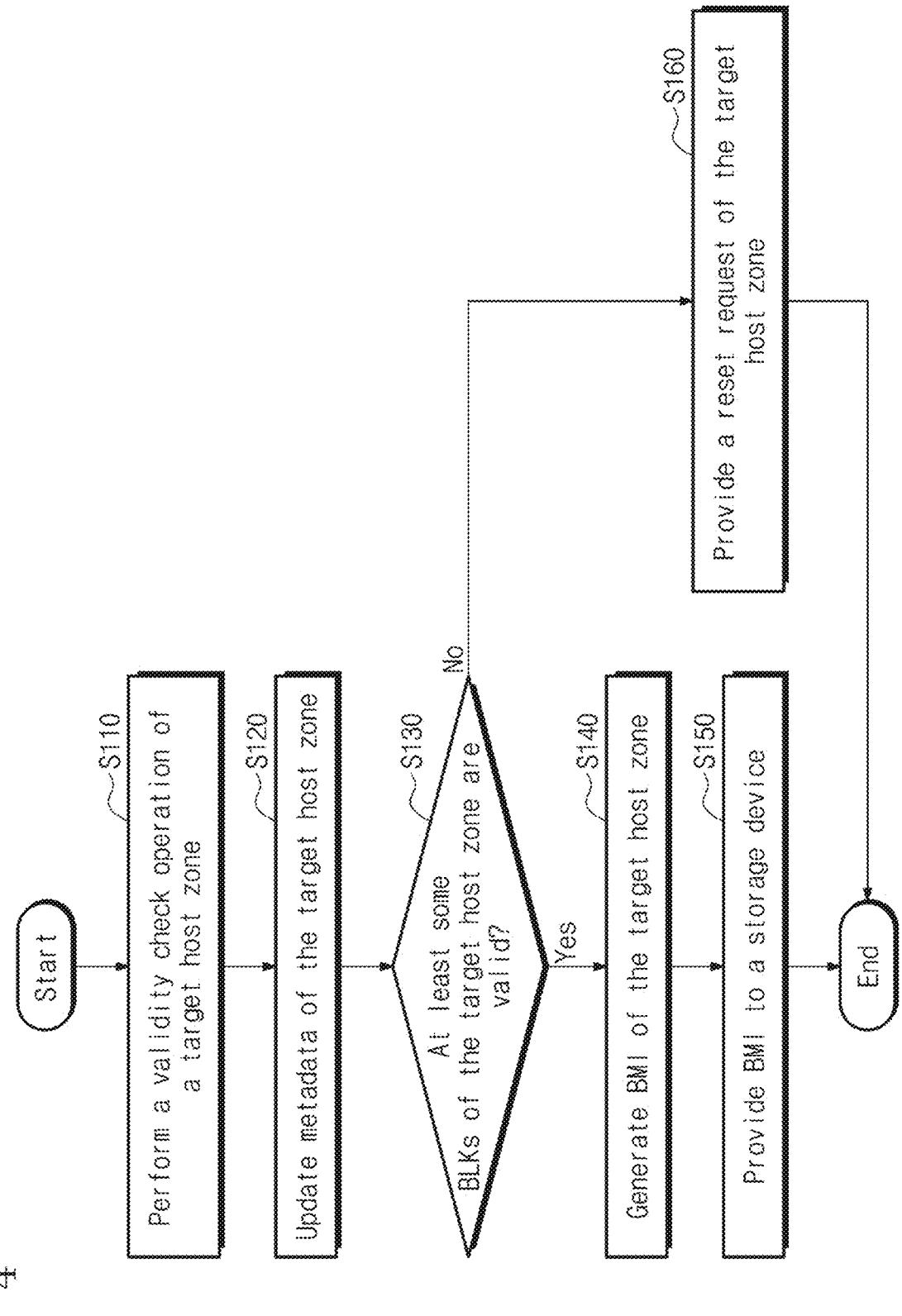
FIG. 4 is a flowchart describing a method of operating a host device according to some example embodiments.

FIG. 4 is a flowchart describing a method of operating a host device according to some example embodiments. Referring to FIG. 4, a host device may communicate with a storage device. The host device may correspond to the host device 110 of FIG. 3.

In operation S110, the host device may perform the validity check operation of a target host zone. For example, the host device 110 and the storage device 120 may communicate with each other through the zone-based interface. The host device 110 may manage a plurality of host zones (e.g., HZ1, HZ2, . . . , HZN, as illustrated in FIG. 3) supporting the sequential write. The host device 110 may perform the validity check operation of the target host zone among the plurality of host zones (e.g., HZ1, HZ2, . . . , HZN, as illustrated in FIG. 3) depending on a request of the user or an operating policy. The validity check operation may include determining whether each of all the data blocks BLK in the target host zone is valid or invalid.

In operation S120, the host device 110 may update metadata of the target host zone. For example, the metadata of the target host zone may include index values of all the data blocks BLK corresponding to the target host zone and validity values of all the data blocks BLK. The validity values may vary depending on data states of the data blocks BLKs.

In operation S130, the host device 110 may determine whether at least some of the data blocks BLK of the target host zone are valid, based on the updated metadata of the target host zone. For example, when at least some of the data blocks BLK of the target host zone are valid, the host device 110 may perform, or be configured to perform, operation S140.

In operation S140, the host device 110 may generate the block map information BMI of the target host zone. The block map information BMI may include identification information of the target host zone and validity information of all the data blocks BLK in the target host zone.

In operation S150, the host device 110 may provide, transmit, or send the block map information BMI to the storage device 120. The provided, transmitted, or sent block map information BMI may be used to control the internal operation in the storage device 120.

In some example embodiments, the host device 110 may asynchronously provide, transmit, or send the block map information BMI to the storage device 120. For example, the storage device 120 may not immediately return, transmit, or send a notification (or a response) indicating that processing of the block map information BMI is completed (e.g., may return, transmit, or send the notification after the internal operation is completed) or may not return, transmit, or send the notification. In some example embodiments, instead of immediately performing the internal operation based on the block map information BMI, at a point in time determined depending on an internal operating policy of the storage device 120, the storage device 120 may perform the internal operation based on the block map information BMI.

Returning to operation S130, in some example embodiments, when all the data blocks BLK of the target host zone are invalid (e.g., when a valid data block BLK is absent from the target host zone), the host device 110 may perform operation S160. For example, the host device 110 may determine whether all the data blocks BLK of the target host zone are invalid (e.g., when a valid data block BLK is absent from the target host zone), and, in response to the determination that all the data blocks BLK of the target host zone are invalid, the host device 110 may perform operation S160.

In operation S160, the host device 110 may provide the storage device 120 with a reset request for the target host zone. In some example embodiments, in operation S160, the host device 110 may transmit or send a reset request for the target host zone to the storage device 120. The reset request may indicate a reset operation of at least one storage zone(s) mapped to the target host zone. The reset operation may include deleting a write pointer(s) of at least one storage zone(s) mapped to the target host zone and performing a physical erase with respect to physical memory blocks corresponding to the at least one storage zone(s).

For example, when all the data blocks BLK of the target host zone are invalid, because there may not be a need, advantage, or desire for the storage device 120 to maintain the reliability of data corresponding to the target host zone to be deleted, the host device 110 may provide, transmit, or send the reset request to the storage device 120 instead of providing, transmitting, or sending the block map information BMI to the storage device 120.

In some example embodiments, when valid data blocks BLK are present in the target host zone (e.g., in the case where "Yes" is determined in operation S130), there may be a need, advantage, or desire for the storage device 120 to maintain the reliability of the valid data blocks BLK for a subsequent read operation. The host device 110 may provide the block map information BMI to the storage device 120 before performing the reset operation, and thus, the efficiency of the internal operation of the storage device 120 may be improved.

Figure 5:
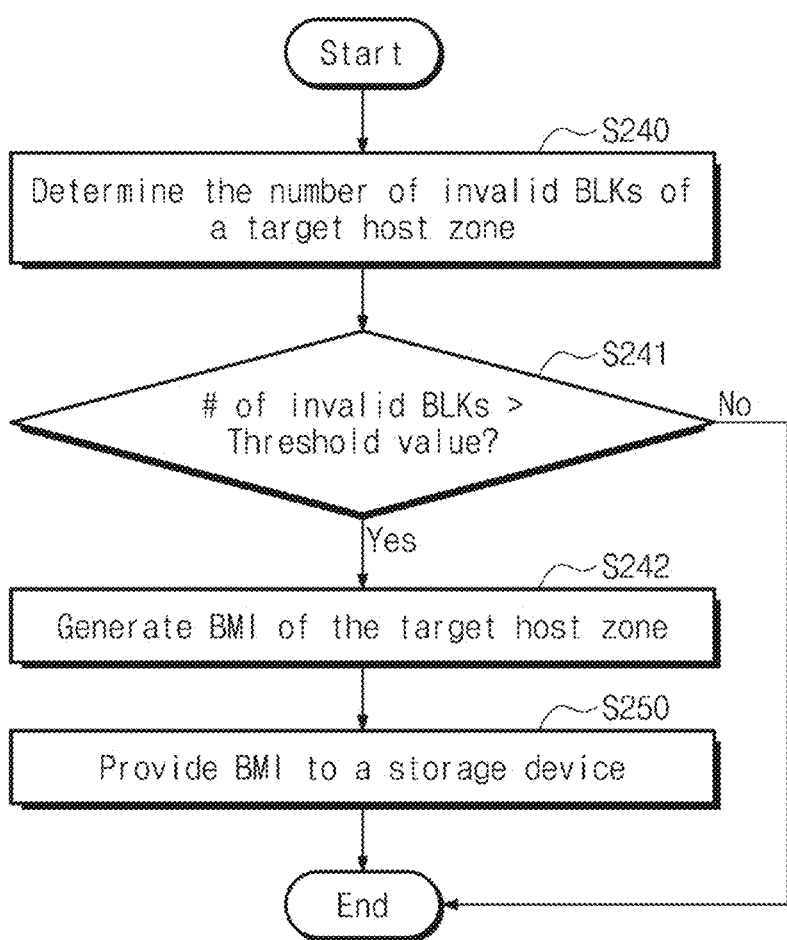
FIG. 5 is a flowchart describing an example of the method of FIG. 4, according to some example embodiments.

FIG. 5 is a flowchart describing an example of the method of FIG. 4, according to some example embodiments of the present inventive concepts. Referring to FIG. 5, the host device 110 may communicate with the storage device 120. The method of operating the host device, according to some example embodiments, may include operation S240, operation S241, operation S242, and operation S250. Operation S240, operation S241, and operation S242 may correspond to operation S140 of FIG. 4. Operation S250 may correspond to operation S150 of FIG. 4.

In operation S240, the host device 110 may determine the number of invalid data blocks BLK among all the data blocks BLK of the target host zone. The target host zone may be one of a plurality of host zones (e.g., HZ1, HZ2, . . . , HZN, as illustrated in FIG. 3) that is managed by the host device 110. The plurality of host zones (e.g., HZ1, HZ2, . . . , HZN, as illustrated in FIG. 3) may support the sequential write.

In operation S241, the host device 110 may determine whether the number of invalid data blocks BLK of the target host zone exceeds a threshold value. For example, when the number of invalid data blocks BLK of the target host zone exceeds the threshold value, the host device 110 may perform operation S242.

In operation S242, the host device 110 may generate the block map information BMI of the target host zone. The block map information BMI may include identification information of the target host zone and validity information of all the data blocks BLK in the target host zone. For example, the validity information may include validity values of invalid data blocks BLK, the number of which exceeds the threshold value (e.g., validity values having the second bit value).

In operation S250, the host device 110 may provide, transmit, or send the block map information BMI to the storage device 120. The provided, transmitted, or sent block map information BMI may be used to control the internal operation in the storage device 120.

Returning to operation S241, in some example embodiments, when the number of invalid data blocks BLK of the target host zone does not exceed the threshold value, the host device 110 may end an operation without generating the block map information BMI of the target host zone.

For example, when invalid data blocks BLK, the number of which exceeds the threshold value, are identified based on the validity check operation of the target host zone, the host device 110 may provide, transmit, or send the block map information BMI to the storage device 120.

Figure 6:
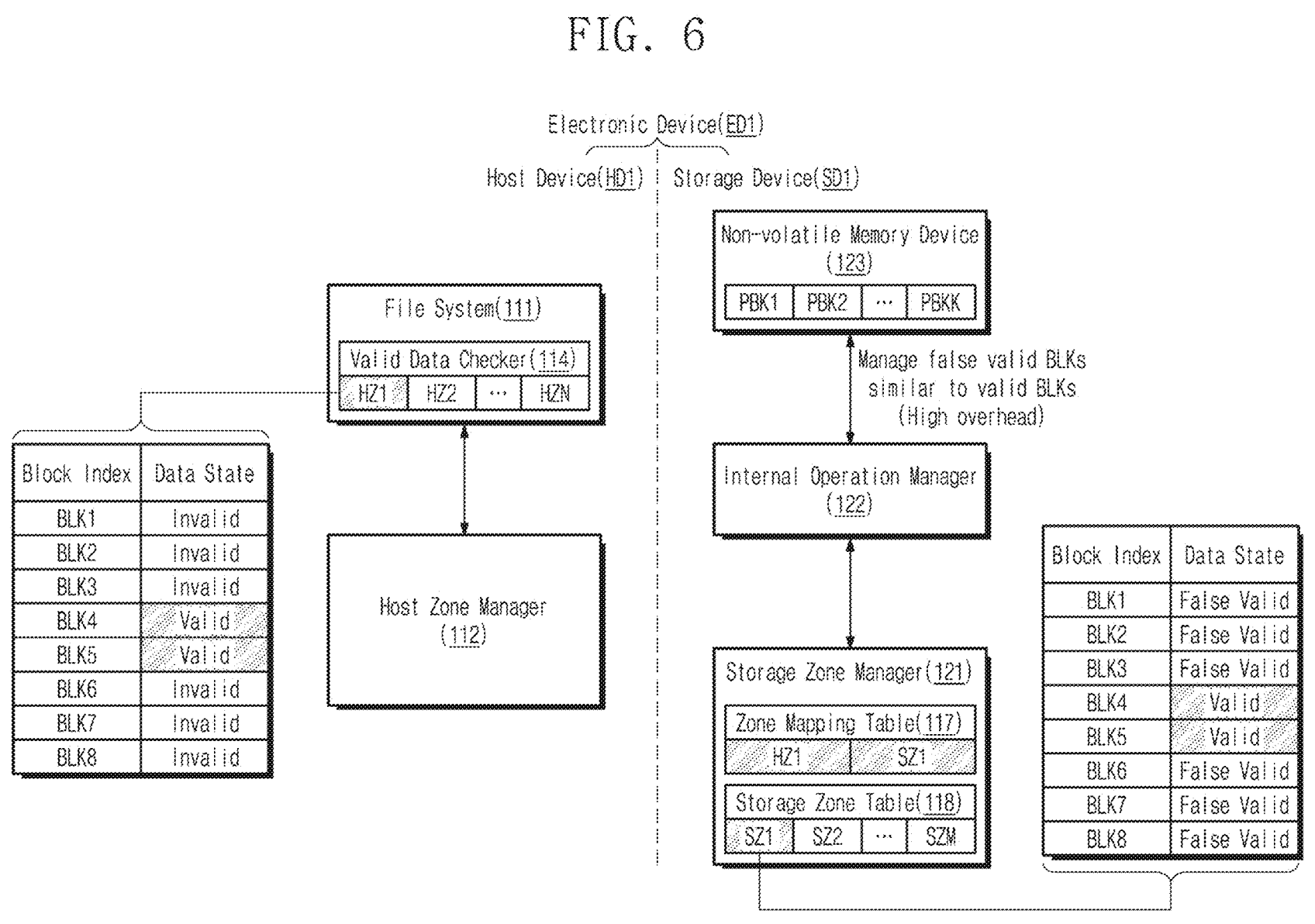

FIG. 6 is a diagram describing a method of operating a conventional electronic device managing a single storage zone mapped to a host zone according to some example embodiments. Referring to FIG. 6, an electronic device ED1 may manage a single storage zone mapped to a host zone. In the electronic device ED1, the mapping ratio of host zones and storage zones may be "1". For better understanding of the present inventive concepts, the electronic device ED1 is described, but the electronic device ED1 may include components or characteristics that are not disclosed in documents of the information disclosure statement. That is, the present inventive concepts are not intended to be limited to the electronic device ED1 illustrated in FIG. 6.

The electronic device ED1 may include a host device HD1 and a storage device SD1. The host device HD1 may include a file system 111 and a host zone manager 112. The storage device SD1 may include a storage zone manager 121, an internal operation manager 122, and a non-volatile memory device 123.

The file system 111 may include a valid data checker 114. The valid data checker 114 may perform the validity check operation of the first host zone HZ1 among the plurality of host zones HZ1 to HZN. The first host zone HZ1 may be also referred to as a "target host zone".

The valid data checker 114 may determine that the fourth and fifth data blocks BLK4 and BLK5 among the first to eighth data blocks BLK1 to BLK8 of the first host zone HZ1 are valid and the remaining data blocks BLK1 to BLK3 and BLK6 to BLK8 are invalid, based on the validity check operation. The valid data checker 114 may provide the host zone manager 112 with validity data information corresponding to a result of the validity check operation.

The host zone manager 112 may manage the plurality of host zones HZ1 to HZN based on the validity data information. The host zone manager 112 may not share the validity data information or the block map information BMI of the first host zone HZ1, which is based on the validity data information, with the storage device SD1.

The storage zone manager 121 may include a zone mapping table 117 and a storage zone table 118. The storage zone manager 121 may store the mapping relationship of the first host zone HZ1 and the first storage zone SZ1 in the zone mapping table 117. The storage zone manager 121 may store metadata of the plurality of storage zones SZ1 to SZM in the storage zone table 118.

The metadata of the first storage zone SZ1 among the plurality of storage zones SZ1 to SZM may include data states of the first to eighth data blocks BLK1 to BLK8 of the first storage zone SZ1. The storage zone manager 121 may determine that all the first to eighth data blocks BLK1 to BLK8 of the first storage zone SZ1 are valid, with reference to the metadata of the first storage zone SZ1 stored in the storage zone table 118.

For example, the fourth and fifth data blocks BLK4 and BLK5 among the first to eighth data blocks BLK1 to BLK8 of the first storage zone SZ1 may be valid, and the first to third data blocks BLK1 to BLK3 and sixth to eighth data blocks BLK6 to BLK8 may be invalid. Because the host zone manager 112 does not provide the block map information BMI to the storage zone manager 121, the storage zone manager 121 may abnormally identify that the first to third data blocks BLK1 to BLK3 and the sixth to eighth data blocks BLK6 to BLK8 being invalid are valid. Accordingly, the data states of the first to third data blocks BLK1 to BLK3 and the sixth to eighth data blocks BLK6 to BLK8 are described as "false valid".

The internal operation manager 122 may perform the internal operation of physical memory blocks corresponding to the first storage zone SZ1 with reference to the storage zone table 118. For example, the non-volatile memory device 123 may include the plurality of physical memory blocks PBK1 to PBKK. The first to eighth physical memory blocks PBK1 to PBK8 among the plurality of physical memory blocks PBK1 to PBKK may be respectively mapped to the first to eighth data blocks BLK1 to BLK8 of the first storage zone SZ1.

In some example embodiments, based on the metadata of the first storage zone SZ1 stored in the storage zone table 118, the internal operation manager 122 may manage the first to third data blocks BLK1 to BLK3 and the sixth to eighth data blocks BLK6 to BLK8 having a "false valid" data state as if they are valid data blocks. For example, the internal operation manager 122 may check distribution information of a data block having a "false valid" data state and may perform the reclaim operation (e.g., a rewrite operation) according to the change of the distribution information.

For example, the resource or resources of the storage device SD1 may be wasted to maintain the reliability of invalid data, which may cause high overhead for data management. Accordingly, it may be required or advantageous to provide a technique for sorting (or selecting) "false valid" data blocks and efficiently managing the "false valid" data blocks.

Figure 7:
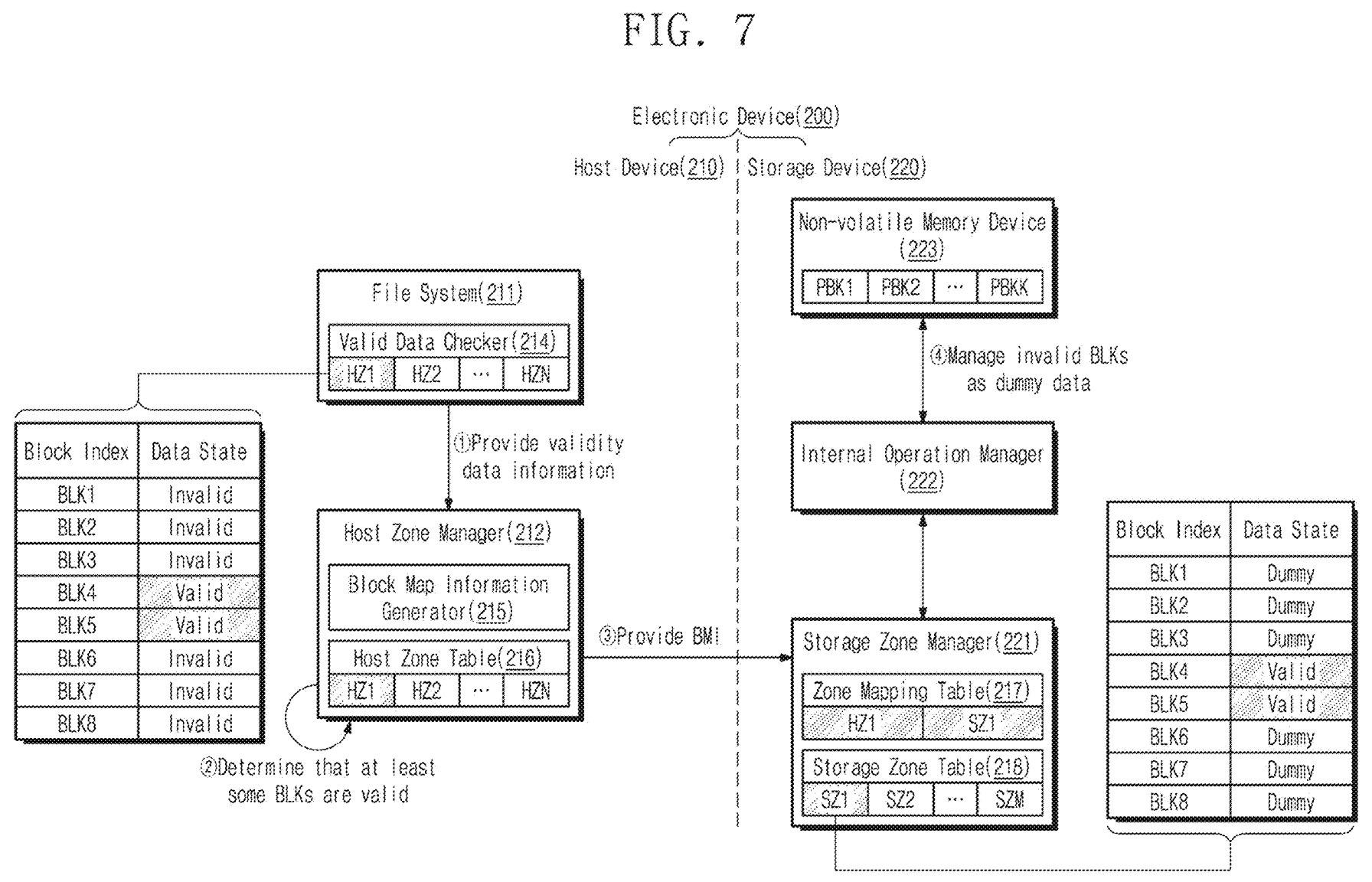

FIG. 7 is a diagram describing a method of operating an electronic device managing a single storage zone mapped to a host zone, according to some example embodiments of the present inventive concepts. Referring to FIG. 7, an electronic device 200 may manage a single storage zone mapped to a host zone. In the electronic device 200, the mapping ratio of host zones and storage zones may be "1".

The electronic device 200 may include a host device 210 and a storage device 220. The host device 210 may include a file system 211 and a host zone manager 212. The storage device 220 may include a storage zone manager 221, an internal operation manager 222, and a non-volatile memory device 223.

The file system 211 may include a valid data checker 214. The valid data checker 214 may perform the validity check operation of the first host zone HZ1 among the plurality of host zones HZ1 to HZN. The first host zone HZ1 may be also referred to as a "target host zone."

The valid data checker 214 may generate validity data information of the first host zone HZ1 based on the validity check operation. The valid data checker 214 may indicate that the fourth and fifth data blocks BLK4 and BLK5 among the first to eighth data blocks BLK1 to BLK8 of the first host zone HZ1 are valid and the first to third data blocks BLK1 to BLK3 and sixth to eighth data blocks BLK6 to BLK8 are invalid.

The host zone manager 212 may manage the plurality of host zones HZ1 to HZN. The host zone manager 212 may include a block map information generator 215 and a host zone table 216. The host zone manager 212 may update metadata of the first host zone HZ1 stored in the host zone table 216, based on the validity data information. The block map information generator 215 may generate the block map information BMI of the first host zone HZ1 based on the updated metadata of the first host zone HZ1. The block map information BMI may include identification information of the first host zone HZ1 and validity information of the first to eighth data blocks BLK1 to BLK8 of the first host zone HZ1.

The storage zone manager 221 may include a zone mapping table 217 and a storage zone table 218. The storage zone manager 221 may store the mapping relationship of the first host zone HZ1 being the target host zone and the first storage zone SZ1 in the zone mapping table 217. The storage zone manager 221 may store metadata of the plurality of storage zones SZ1 to SZM in the storage zone table 218. The storage zone manager 221 may update the metadata of the first storage zone SZ1 of the storage zone table 218 based on the block map information BMI.

The updated metadata of the first storage zone SZ1 may include updated data states of the first to eighth data blocks BLK1 to BLK8 of the first storage zone SZ1. With reference to the updated metadata of the first storage zone SZ1 of the storage zone table 218, in some example embodiments, the storage zone manager 221 may determine that the fourth and fifth data blocks BLK4 and BLK5 among the first to eighth data blocks BLK1 to BLK8 of the first storage zone SZ1 are valid and the first to third data blocks BLK1 to BLK3 and sixth to eighth data blocks BLK6 to BLK8 are invalid.

The storage zone manager 221 may manage the first to third data blocks BLK1 to BLK3 and sixth to eighth data blocks BLK6 to BLK8 being invalid, as dummy data blocks. For example, the dummy data block may refer to a data block that does not store valid data, maintains validity of a write pointer in a storage zone, and stores an arbitrary value for using an existing address mapping relationship without modification (or a value not experiencing the reliability operation for an existing value).

The internal operation manager 222 may perform the internal operation of physical memory blocks corresponding to the first storage zone SZ1 with reference to the updated metadata of the first storage zone SZ1 stored in the storage zone table 218 of the storage zone manager 221. For example, the non-volatile memory device 223 may include the plurality of physical memory blocks PBK1 to PBKK. The first to eighth physical memory blocks PBK1 to PBK8 among the plurality of physical memory blocks PBK1 to PBKK may be respectively mapped to the first to eighth data blocks BLK1 to BLK8 of the first storage zone SZ1.

Below, a method of operating the electronic device 200 that manages a single storage zone mapped to a host zone will be described according to some example embodiments.

In a first operation ①, the file system 211 may provide validity data information to the host zone manager 212 based on the validity check operation of the first host zone HZ1. The validity data information may indicate whether each of all the data blocks BLKs of the first host zone HZ1 is valid.

In a second operation ②, the host zone manager 212 may determine that some of the first to eighth data blocks BLK1 to BLK8 of the first host zone HZ1 are valid, based on the validity data information. For example, the host zone manager 212 may determine that the fourth and fifth data blocks BLK4 and BLK5 of the first host zone HZ1 are valid. For example, the host zone manager 212 may determine that some of all the data blocks BLKs in the target host zone are valid.

In a third operation ③, the host zone manager 212 may provide the block map information BMI of the target host zone to the storage zone manager 221. For example, in response to determining that some data blocks BLKs in the first host zone HZ1 are valid, the host zone manager 212 may generate the block map information BMI of the first host zone HZ1 through a block map information generator 215. The block map information BMI may include identification information of the first host zone HZ1 and validity information of all the data blocks of the first host zone HZ1.

In a fourth operation ④, the storage device 220 may manage invalid data blocks BLKs as dummy data blocks based on the block map information BMI. For example, the storage zone manager 221 may search for the first storage zone SZ1 mapped to the first host zone HZ1 being the target host zone with reference to the zone mapping table 217 and may update the metadata of the first storage zone SZ1 in the storage zone table 218 based on the block map information BMI.

The internal operation manager 222 may refer to the updated metadata of the first storage zone SZ1 from the storage zone table 218. According to the updated metadata of the first storage zone SZ1, the fourth and fifth data blocks BLK4 and BLK5 of the first storage zone SZ1 may store valid data, and the first to third data blocks BLK1 to BLK3 and the sixth to eighth data blocks BLK6 to BLK8 may store invalid data.

The internal operation manager 222 may perform normal internal operations with respect to the fourth and fifth data blocks BLK4 and BLK5 storing valid data. For example, the internal operation manager 222 may check distribution information of the fourth and fifth data blocks BLK4 and BLK5 and may perform the reclaim operation according to a change of the distribution information.

According to some example embodiments, internal operation manager 222 may omit at least some of the internal operations with respect to the first to third data blocks BLK1 to BLK3 and sixth to eighth data blocks BLK6 to BLK8 storing invalid data. For example, the internal operation manager 222 may not check distribution information of the first to third data blocks BLK1 to BLK3 and sixth to eighth data blocks BLK6 to BLK8 storing invalid data whose reliability maintenance may not be important or may omit the reclaim operation according to a change of the distribution information.

As described above, according to some example embodiments of the present inventive concepts, there may be provided an interface that allows the host device 210 and the storage device 220 to share the block map information BMI of the target host zone in which an invalid data block and a valid data block are present together. The storage device 220 may manage invalid data as dummy data based on the block map information BMI, and thus, the burden or cost of data management may decrease. Thus, in some example embodiments, the waste of resource or resources of the storage device for maintaining the reliability of invalid data may be suppressed or reduced and overhead for data management may decrease.

Figure 8:
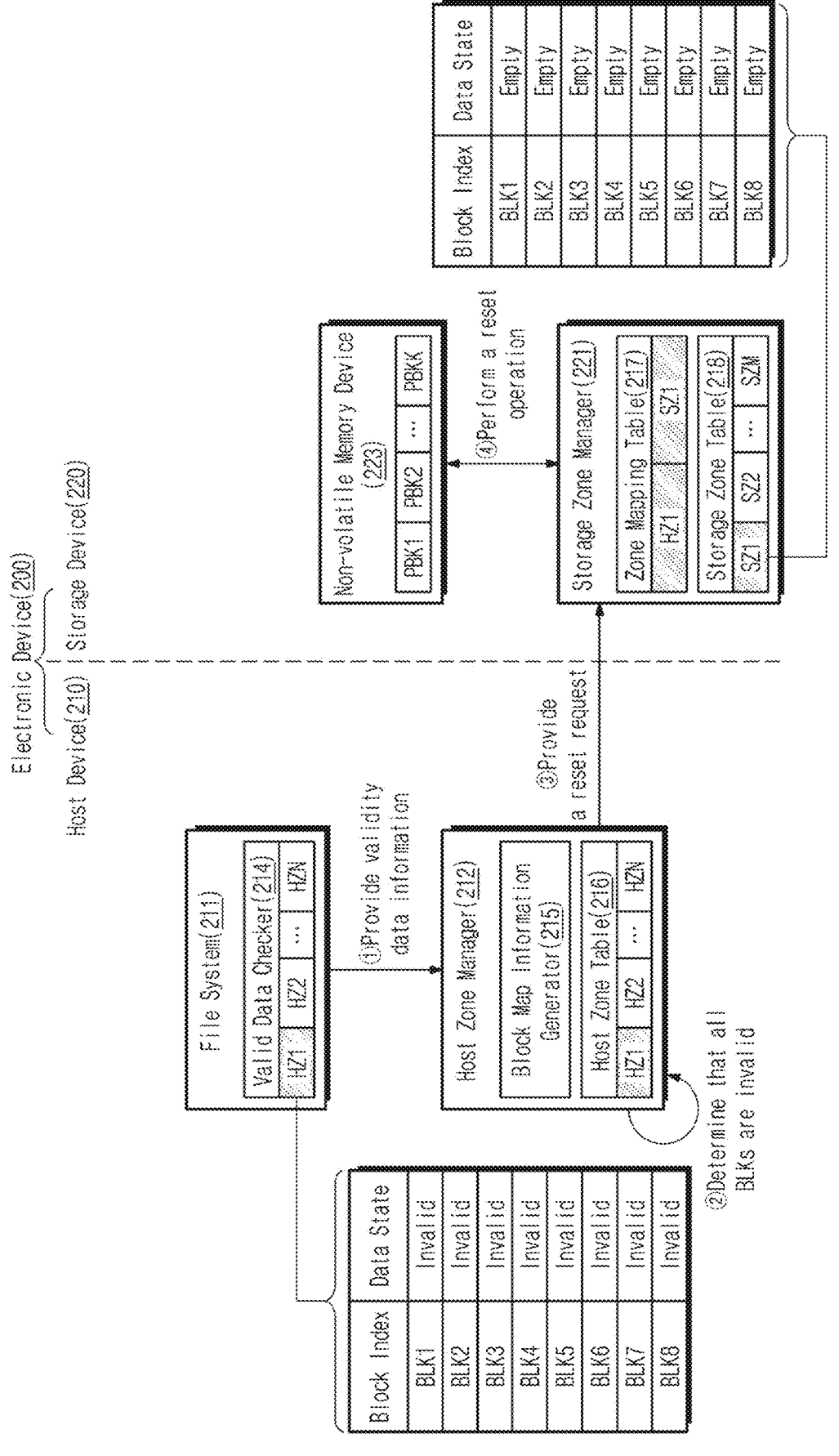
FIG. 8 is a diagram describing a method of operating an electronic device managing a single storage zone mapped to a host zone, according to some example embodiments.

FIG. 8 is a diagram describing a method of operating an electronic device managing a single storage zone mapped to a host zone, according to some example embodiments of the present inventive concepts. Referring to FIG. 8, the electronic device 200 may manage a single storage zone mapped to a host zone. In the electronic device 200, the mapping ratio of host zones and storage zones may be "1".

The electronic device 200 may include the host device 210 and the storage device 220. The host device 210 may include the file system 211 and the host zone manager 212. The storage device 220 may include the storage zone manager 221 and the non-volatile memory device 223.

The file system 211, the host zone manager 212, the storage zone manager 221, and the non-volatile memory device 223 are similar to the file system 211, the host zone manager 212, the storage zone manager 221, and the non-volatile memory device 223 of FIG. 7, and thus, additional description will be omitted to avoid redundancy.

Below, a method of operating the electronic device 200 that manages a single storage zone mapped to a host zone will be described.

In a first operation ①, the file system 211 may provide validity data information to the host zone manager 212 based on the validity check operation of the first host zone HZ1. The validity data information may indicate whether each of all the data blocks BLKs of the first host zone HZ1 is valid.

In a second operation ②, the host zone manager 212 may determine that all the first to eighth data blocks BLK1 to BLK8 of the first host zone HZ1 are invalid, based on the validity data information. For example, the host zone manager 212 may determine that all the data blocks BLKs in the target host zone are invalid.

In a third operation ③, the host zone manager 212 may provide the reset request for the target host zone to the storage zone manager 221. For example, in response to determining that all the data blocks of the first host zone HZ1 are invalid, the host zone manager 212 may provide the storage zone manager 221 with the reset request indicating the reset operation of the first host zone HZ1.

In a fourth operation ④, the storage zone manager 221 may perform the reset operation of the first storage zone SZ1 mapped to the first host zone HZ1 based on the reset request.

For example, the storage zone manager 221 may search for the first storage zone SZ1 mapped to the first host zone HZ1 being the target host zone with reference to the zone mapping table 217, may search for the first to eighth physical memory blocks PBK1 to PBK8 mapped to the first to eighth data blocks BLK1 to BLK8 of the first storage zone SZ1 with reference to the storage zone table 218, may perform a physical erase of the first to eighth physical memory blocks PBK1 to PBK8 among the plurality of physical memory blocks PBK1 to PBKK in the non-volatile memory device 223 or may perform unmapping (e.g., deletion of an L2P (logical-to-physical) mapping relationship) thereof, may set the data states of the first to eighth data blocks BLK1 to BLK8 of the first storage zone SZ1 to an empty state in the storage zone table 218, and may initialize a write pointer (WP) in the storage zone table 218.

The first storage zone SZ1 where the reset operation is performed may be referred to as an "empty storage zone". The empty storage zone may be used to store new data in a subsequent write operation or may be deallocated depending on a request of the host device 210.

Figure 9:
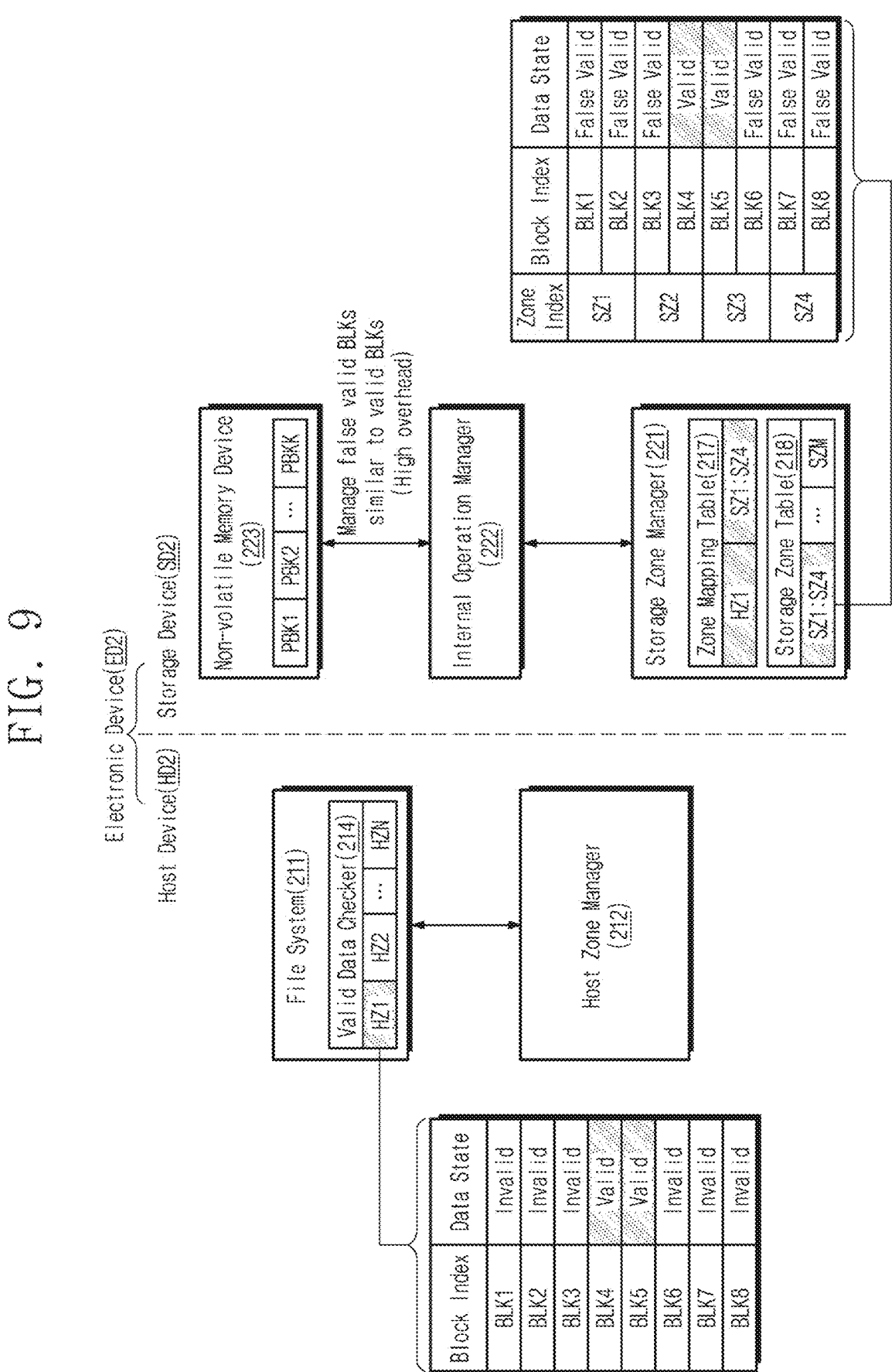
FIG. 9 is a diagram describing a method of operating a conventional electronic device managing a plurality of storage zones mapped to a host zone according to some example embodiments.

FIG. 9 is a diagram describing a method of operating a conventional electronic device managing a plurality of storage zones mapped to a host zone according to some example embodiments. Referring to FIG. 9, an electronic device ED2 may manage a plurality of storage zones mapped to a host zone. In the electronic device ED2, the mapping ratio of host zones and storage zones may be "4". For better understanding of the present inventive concepts, the electronic device ED2 is described, but the electronic device ED2 may include components or characteristics that are not disclosed in documents of the information disclosure statement. Also, the number of storage zones to be mapped to a host zone may be more than or less than four. For example, the present inventive concepts are not intended to be limited to the electronic device ED2 illustrated in FIG. 9.

The electronic device ED2 may include a host device HD2 and a storage device SD2. The host device HD2 may include a file system 211 and a host zone manager 212. The storage device SD2 may include a storage zone manager 221, an internal operation manager 222, and a non-volatile memory device 223.

The file system 211, the host zone manager 212, the storage zone manager 221, the internal operation manager 222, and the non-volatile memory device 223 are similar to the file system 111, the host zone manager 112, the storage zone manager 121, the internal operation manager 122, and the non-volatile memory device 123 of FIG. 6, and thus, additional description will be omitted to avoid redundancy.

A valid data checker 214 of the file system 211 may perform the validity check operation of the first host zone HZ1 and may provide the host zone manager 212 with validity data information corresponding to a result of the validity check operation. The host zone manager 212 may not share the validity data information or the block map information BMI of the first host zone HZ1, which is based on the validity data information, with the storage device SD2.

The storage zone manager 221 may include a zone mapping table 217 and a storage zone table 218. The storage zone manager 221 may store the mapping relationship of the first host zone HZ1 and the first to fourth storage zones SZ1 to SZ4 in the zone mapping table 217. The storage zone manager 221 may store metadata of the plurality of storage zones SZ1 to SZM in the storage zone table 218.

The metadata of the first to fourth storage zones SZ1 to SZ4 among the plurality of storage zones SZ1 to SZM may include data states corresponding to the first to eighth data blocks BLK1 to BLK8 corresponding to the first to fourth storage zones SZ1 to SZ4. The storage zone manager 221 may determine that all the first to eighth data blocks BLK1 to BLK8 corresponding to the first to fourth storage zones SZ1 to SZ4 are valid, with reference to the metadata of the first to fourth storage zones SZ1 to SZ4 stored in the storage zone table 218.

As in the electronic device ED1 described with reference to FIG. 6, the storage zone manager 221 may abnormally identify that the first to third data blocks BLK1 to BLK3 and the sixth to eighth data blocks BLK6 to BLK8 being invalid are valid. Based on the metadata of the first to fourth storage zones SZ1 to SZ4 stored in the storage zone table 218, the internal operation manager 222 may manage the first to third data blocks BLK1 to BLK3 and the sixth to eighth data blocks BLK6 to BLK8 having a "false valid" data state as if they are valid data blocks.

For example, the resource or resources of the storage device SD2 may be wasted to maintain the reliability of invalid data, which causes high overhead for data management. Accordingly, it may be required or advantageous to provide a technique for sorting (or selecting) "false valid" data blocks and efficiently managing the "false valid" data blocks.

Figure 10:
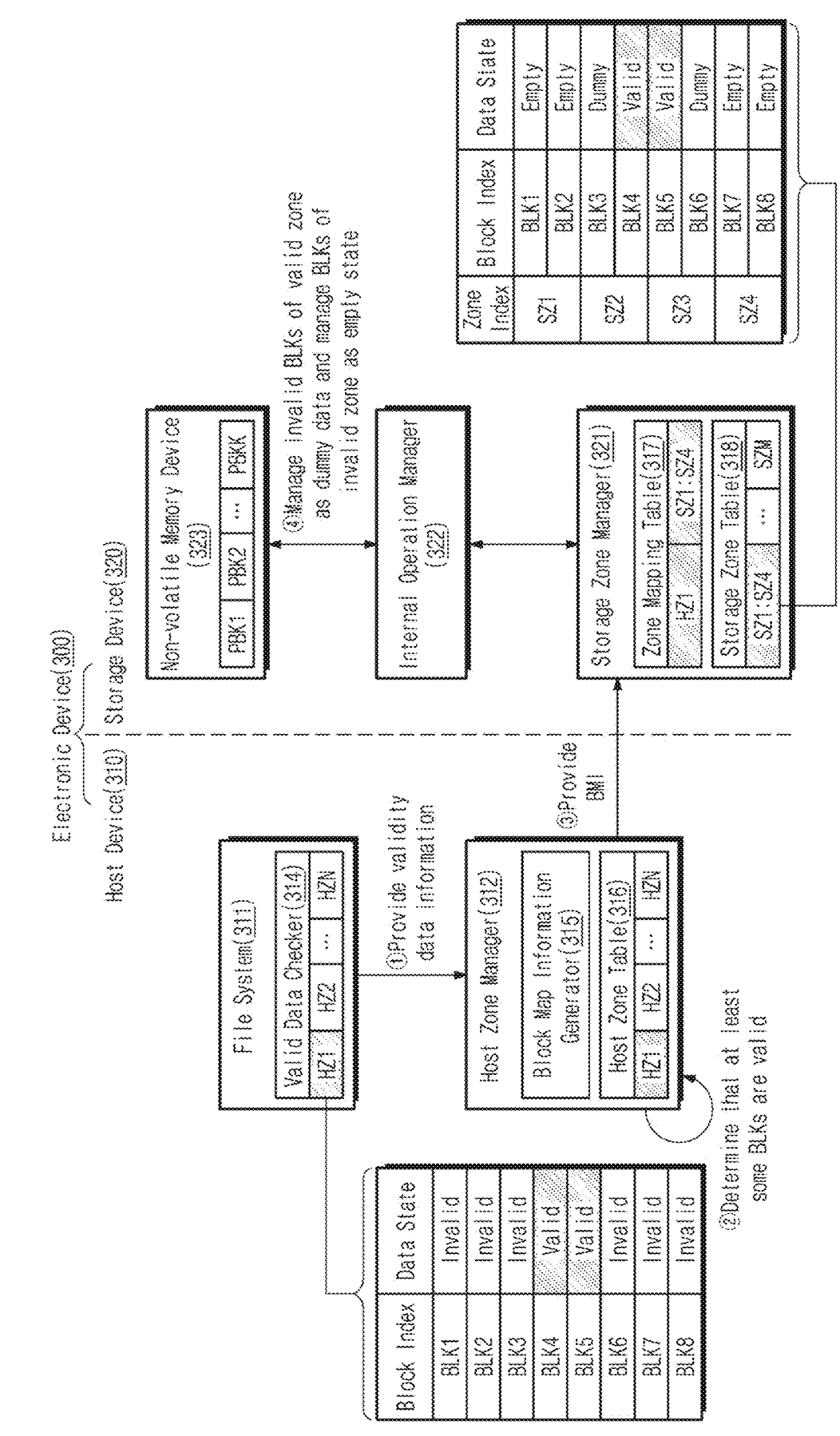
FIG. 10 is a diagram describing a method of operating an electronic device managing a plurality of storage zones mapped to a host zone, according to some example embodiments.

FIG. 10 is a diagram describing a method of operating an electronic device managing a plurality of storage zones mapped to a host zone, according to some example embodiments of the present inventive concepts. Referring to FIG. 10, an electronic device 300 may include a plurality of storage zones mapped to a host zone. In the electronic device 300, the mapping ratio of host zones and storage zones may be "4". However, the present inventive concepts are not limited thereto. For example, the number of storage zones to be mapped to a host zone may be more than or equal to four, or less than or equal to four.

The electronic device 300 may include a host device 310 and a storage device 320. The host device 310 may include a file system 311 and a host zone manager 312. The storage device 320 may include a storage zone manager 321, an internal operation manager 322, and a non-volatile memory device 323.

The file system 311, the host zone manager 312, the storage zone manager 321, the internal operation manager 322, and the non-volatile memory device 323 are similar to the file system 211, the host zone manager 212, the storage zone manager 221, the internal operation manager 222, and the non-volatile memory device 223 of FIG. 7, and thus, additional description will be omitted to avoid redundancy.

The storage zone manager 321 may include a zone mapping table 317 and a storage zone table 318. The storage zone manager 321 may store the mapping relationship of the first host zone HZ1 being the target host zone and the first to fourth storage zones SZ1 to SZ4 in the zone mapping table 317. The storage zone manager 321 may store metadata of the first to fourth storage zones SZ1 to SZ4 in the storage zone table 318. The storage zone manager 321 may update the metadata of the first to fourth storage zones SZ1 to SZ4 of the storage zone table 318 based on the block map information BMI.

Below, a method of operating the electronic device 300 that manages a plurality of storage zones mapped to a host zone will be described according to some example embodiments.

In a first operation ①, the file system 311 may provide validity data information to the host zone manager 312 based on the validity check operation of the first host zone HZ1. The validity data information may indicate whether each of all the data blocks BLKs of the first host zone HZ1 is valid.

In a second operation ②, the host zone manager 312 may determine that some of the first to eighth data blocks BLK1 to BLK8 of the first host zone HZ1 are valid, based on the validity data information. For example, the host zone manager 312 may determine that the fourth and fifth data blocks BLK4 and BLK5 of the first host zone HZ1 are valid. For example, the host zone manager 312 may determine that some of all the data blocks BLKs in the target host zone are valid.

In a third operation ③, the host zone manager 312 may provide the block map information BMI of the target host zone to the storage zone manager 321. For example, in response to determining that some data blocks BLKs in the first host zone HZ1 are valid, the host zone manager 312 may generate the block map information BMI of the first host zone HZ1 through a block map information generator 315. The block map information BMI may include identification information of the first host zone HZ1 and validity information of all the data blocks BLKs of the first host zone HZ1.

In a fourth operation ④, the storage device 320 may manage invalid data blocks BLK as dummy data blocks based on the block map information BMI. For example, the storage zone manager 321 may search for the first to fourth storage zones SZ1 to SZ4 mapped to the first host zone HZ1 being the target host zone with reference to the zone mapping table 317 and may update the metadata of the first to fourth storage zones SZ1 to SZ4 in the storage zone table 318 based on the block map information BMI.

In some example embodiment, while (e.g., during, simultaneously, or concurrently) updating the metadata based on the block map information BMI, the storage zone manager 321 may manage, as dummy data blocks, the first to third data blocks BLK1 to BLK3 and sixth to eighth data blocks BLK6 to BLK8 among the first to eighth data blocks BLK1 to BLK8 corresponding to the first to fourth storage zones SZ1 to SZ4 based on the block map information BMI.

In some example embodiments, the storage zone manager 321 may identify invalid storage zones (e.g., the first and fourth storage zones SZ1 and SZ4), in which all the data blocks are dummy data blocks, from among the first to fourth storage zones SZ1 to SZ4. The storage zone manager

321 may perform the reset operation of the first and fourth storage zones SZ1 and SZ4. After the reset operation, the first, second, seventh, and eighth data blocks BLK1, BLK2, BLK7, and BLK8 of the first and fourth storage zones SZ1 and SZ4 may be in an empty state.

The internal operation manager 322 may refer to the updated metadata of the first to fourth storage zones SZ1 to SZ4 from the storage zone table 318. In some example embodiments, according to the updated metadata of the first to fourth storage zones SZ1 to SZ4, the fourth and fifth data blocks BLK4 and BLK5 among the first to eighth data blocks BLK1 to BLK8 may store valid data, the third and sixth data blocks BLK3 and BLK6 among the first to eighth data blocks BLK1 to BLK8 may store dummy data, and the first, second, seventh, and eighth data blocks BLK1, BLK2, BLK7, and BLK8 among the first to eighth data blocks BLK1 to BLK8 may be empty data blocks.

The internal operation manager 322 may perform normal internal operations with respect to the fourth and fifth data blocks BLK4 and BLK5 storing valid data. For example, the internal operation manager 322 may check distribution information of the fourth and fifth data blocks BLK4 and BLK5 and may perform the reclaim operation according to a change of the distribution information.

In some example embodiments, the internal operation manager 322 may omit at least some of the internal operations with respect to the third and sixth data blocks BLK3 and BLK6 storing dummy data. For example, the internal operation manager 322 may not check distribution information of the third and sixth data blocks BLK3 and BLK6 storing dummy data whose reliability maintenance may not be important or may omit the reclaim operation according to a change of the distribution information.

In some example embodiments, the internal operation manager 322 may not perform the internal operations with respect to the first, second, seventh, and eighth data blocks BLK1, BLK2, BLK7, and BLK8 being empty data blocks. Also, in some example embodiments, depending on an allocation request of the host device 310 (e.g., depending on an allocation request received from the host device 310), the storage zone manager 321 may allocate the first, second, seventh, and eighth data blocks BLK1, BLK2, BLK7, and BLK8 being empty data blocks to any other host zone (e.g., the second host zone HZ2). Accordingly, in some example embodiments, the storage device 320 resets a storage zone including only invalid data, and the storage device 320 may utilize the storage space flexibly and efficiently.

As described above, according to some example embodiments of the present inventive concepts, there may be provided an interface that allows the host device 310 and the storage device 320 to share the block map information BMI of the target host zone in which an invalid data block and a valid data block are present together. The storage device 320 may manage invalid data as dummy data based on the block map information BMI or may reset an invalid storage zone, and thus, the burden or cost of data management may decrease. According to some example embodiments, the storage device 320 may reset an invalid storage zone based on the block map information BMI, and thus, the waste of the storage space may be reduced or minimized. For example, the waste of resources of the storage device 320 for maintaining the reliability of invalid data may be suppressed or reduced, overhead for data management may be decreased, and valid (e.g., substantially available, or available) storage space may increase.

Figure 11:
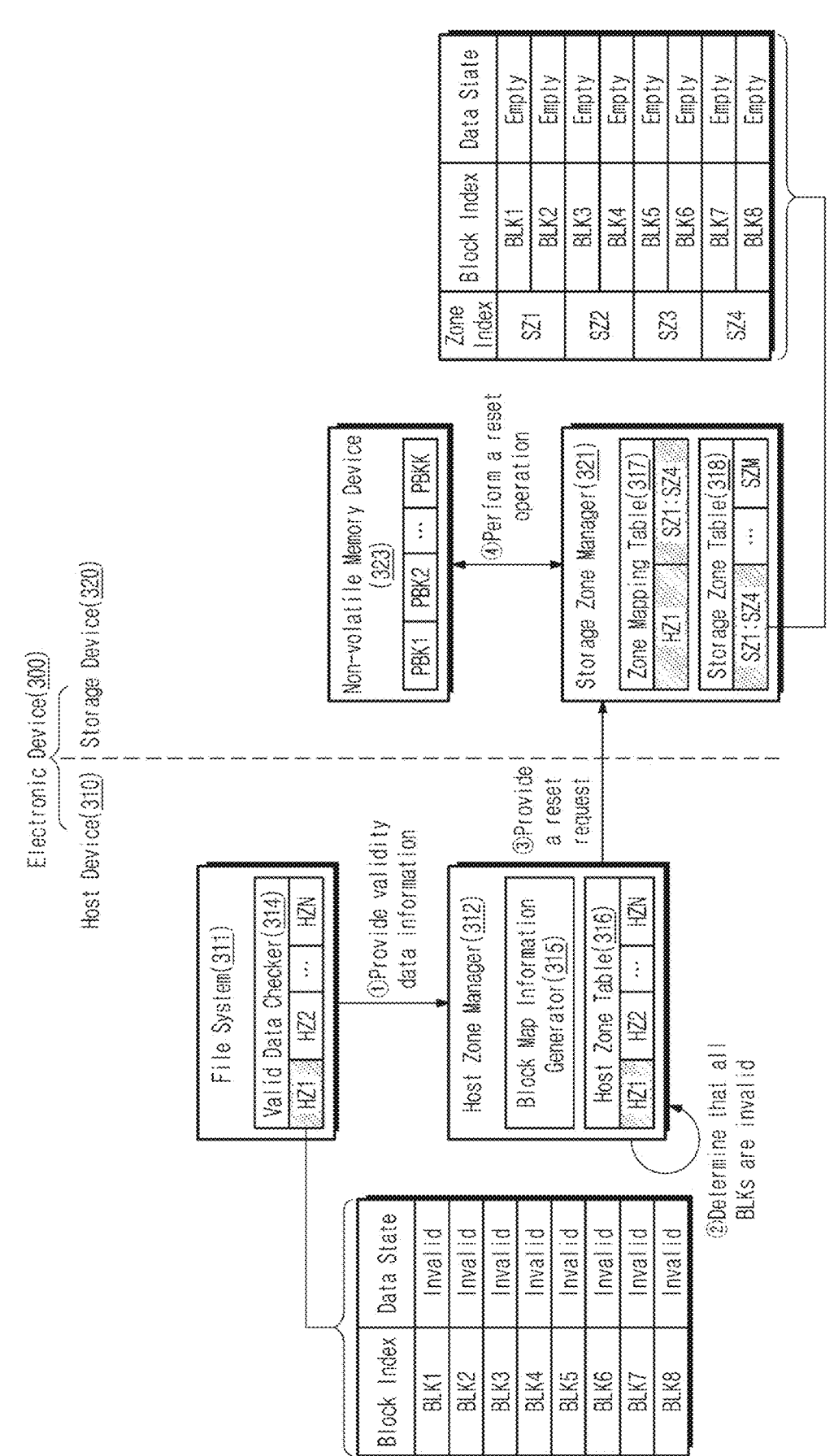
FIG. 11 is a diagram describing a method of operating an electronic device managing a plurality of storage zones mapped to a host zone, according to some example embodiments.

FIG. 11 is a diagram describing a method of operating an electronic device managing a plurality of storage zones mapped to a host zone, according to some example embodiments of the present inventive concepts. Referring to FIG. 11, the electronic device 300 may include a plurality of storage zones mapped to a host zone. In the electronic device 300, the mapping ratio of host zones and storage zones may be "4". However, the present inventive concepts are not limited thereto. For example, the number of storage zones to be mapped to a host zone may be more than or equal to four, or less than or equal to four.

The electronic device 300 may include the host device 310 and the storage device 320. The host device 310 may include the file system 311 and the host zone manager 312. The storage device 320 may include the storage zone manager 321 and the non-volatile memory device 323.

The file system 311, the host zone manager 312, the storage zone manager 321, and the non-volatile memory device 323 are similar to the file system 311, the host zone manager 312, the storage zone manager 321, and the non-volatile memory device 323 of FIG. 10, and thus, additional description will be omitted to avoid redundancy.

Below, a method of operating the electronic device 300 that manages a plurality of storage zones mapped to a host zone will be described according to some example embodiments.

In a first operation ①, the file system 311 may provide validity data information to the host zone manager 312 based on the validity check operation of the first host zone HZ1. The validity data information may indicate whether each of all the data blocks BLKs of the first host zone HZ1 is valid.

In a second operation ②, the host zone manager 312 may determine that all the first to eighth data blocks BLK1 to BLK8 of the first host zone HZ1 are invalid, based on the validity data information. For example, the host zone manager 312 may determine that all the data blocks BLKs in the target host zone are invalid.

In a third operation ③, the host zone manager 312 may provide, transmit, or send the reset request for the target host zone to the storage zone manager 321. For example, in response to determining that all the data blocks BLKs of the first host zone HZ1 are invalid, the host zone manager 312 may provide, transmit, or send to the storage zone manager 321 the reset request indicating the reset operation of the first host zone HZ1.

In a fourth operation ④, the storage zone manager 321 may perform the reset operation of the first to fourth storage zones SZ1 to SZ4 mapped to the first host zone HZ1 based on the reset request.

For example, the storage zone manager 321 may search for the first to fourth storage zones SZ1 to SZ4 mapped to the first host zone HZ1 being the target host zone with reference to the zone mapping table 317, may search for the first to eighth physical memory blocks PBK1 to PBK8 mapped to the first to eighth data blocks BLK1 to BLK8 of the first to fourth storage zones SZ1 to SZ4 with reference to the storage zone table 318, may perform a physical erase of the first to eighth physical memory blocks PBK1 to PBK8 among the plurality of physical memory blocks PBK1 to PBKK in the non-volatile memory device 323 or may perform unmapping (e.g., deletion of an L2P (logical-to-physical) mapping relationship) thereof, may set the data states of the first to eighth data blocks BLK1 to BLK8 of the first to fourth storage zones SZ1 to SZ4 to an empty state in the storage zone table 318, and may initialize a write pointer (WP) in the storage zone table 318.

The first to fourth storage zones SZ1 to SZ4 where the reset operation is performed may be referred to as "empty storage zones." The empty storage zones may be used to store new data in a subsequent write operation or may be deallocated depending on a request of the host device 310.

Figure 12:
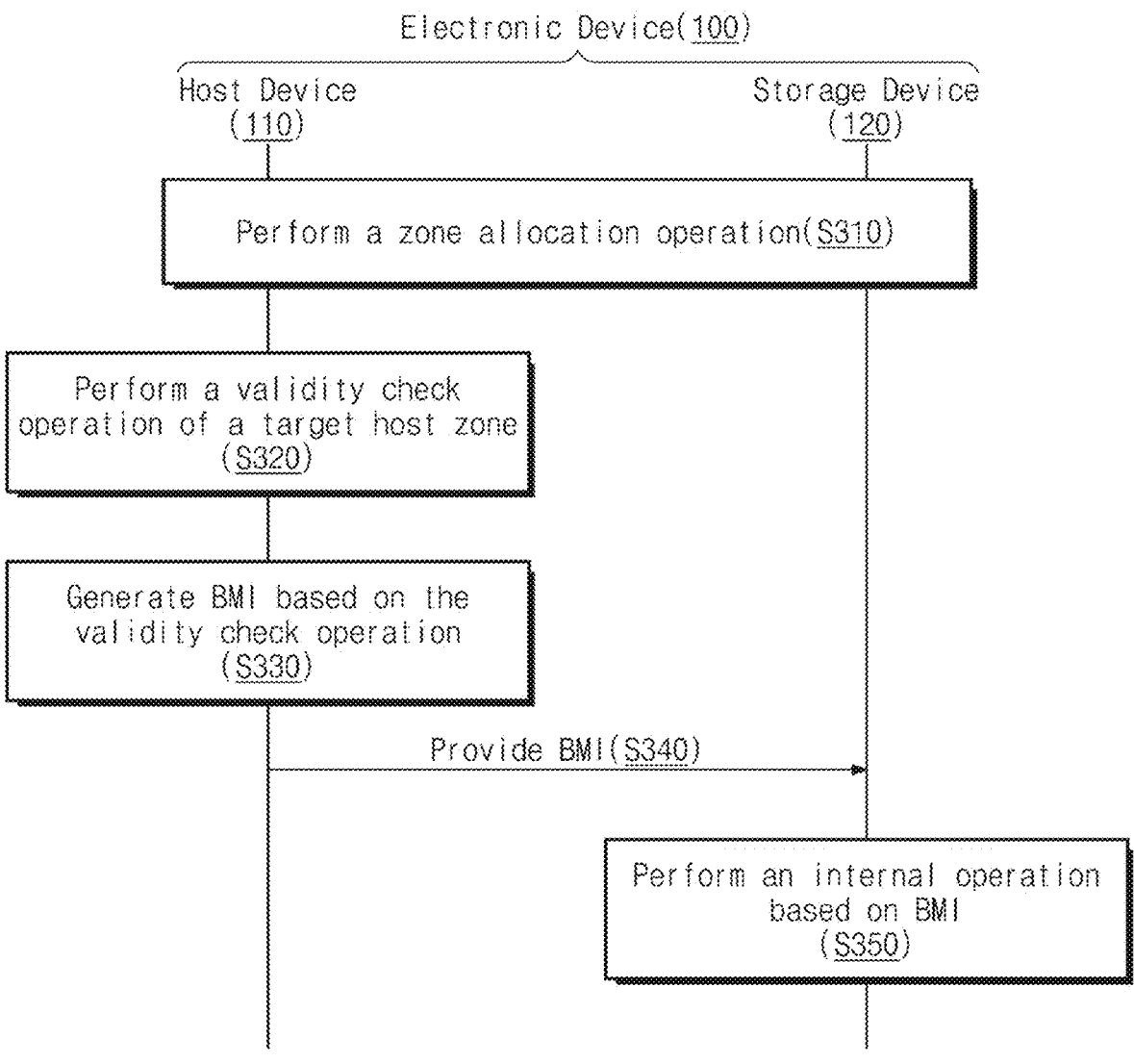
FIG. 12 is a flowchart describing a method of operating an electronic device according to some example embodiments.

FIG. 12 is a flowchart describing a method of operating an electronic device according to some example embodiments of the present inventive concepts. Referring to FIG. 12, the electronic device 100 may include the host device 110 and the storage device 120. The host device 110 may correspond to the host device 110 of FIGS. 1 and 3, the host device 210 of FIGS. 7 and 8, or the host device 310 of FIGS. 10 and 11. The storage device 120 may correspond to the storage device 120 of FIGS. 1 and 3, the storage device 220 of FIGS. 7 and 8, or the storage device 320 of FIGS. 10 and 11.

In operation S310, the electronic device 100 may perform a zone allocation operation. For example, the host device 110 may provide the storage device 120 with an allocation request of a target host zone among a plurality of host zones. The storage device 120 may allocate at least one of a plurality of storage zones to the target host zone based on the allocation request. The storage device 120 may return to the host device 110, a response indicating that the allocation request is processed.

In some example embodiments, the electronic device 100 may allocate a single storage zone to the target host zone based on the allocation request. For example, the allocation request may include information of a mapping ratio, the mapping ratio may be "1." The storage device 120 may allocate one of the plurality of storage zones to the target host zone based on the mapping ratio of the allocation request.

In some example embodiments, the electronic device 100 may allocate a plurality of storage zones to the target host zone based on the allocation request. For example, the allocation request may include information of a mapping ratio, the mapping ratio may be a natural number more than or equal to two. The storage device 120 may allocate at least two of the plurality of storage zones to the target host zone based on the mapping ratio of the allocation request.

In operation S320, the host device 110 may perform the validity check operation of the target host zone among the plurality of host zones.

In operation S330, the host device 110 may generate the block map information BMI of the target host zone based on the validity check operation. The block map information BMI may include identification information of the target host zone and validity information of all the data blocks in the host zone.

In operation S340, the host device 110 may provide the block map information BMI to the storage device 120.

In operation S350, the storage device 120 may perform the internal operation based on the block map information BMI. For example, based on the block map information BMI, the storage device 120 may manage invalid data blocks among data blocks corresponding to at least one storage zone(s) mapped to the target host zone, as dummy data blocks. In some example embodiments, the storage device 120 may omit the management operation of distribution information of the dummy data blocks.

In some example embodiments, the storage device 120 may identify an invalid storage zone among at least one storage zone(s) mapped to the target host zone. The invalid storage zone may refer to a storage zone in which all the data blocks are managed as dummy data blocks. The storage device 120 may generate an empty storage zone by performing the reset operation of the invalid storage zone. The host device 110 may provide the storage device 120 with a second allocation request of a second host zone different from the target host zone. The storage device 120 may allocate the empty storage zone to the second host zone based on the second allocation request.

According to some example embodiments of the present inventive concepts, a host device generating block map information BMI, a method of operating the host device, and a method of operating an electronic device including the host device are provided.

According to some example embodiments of the present inventive concepts, as a storage device manages invalid data as dummy data based on the block map information BMI, the burden or cost of data management may decrease. In some example embodiments, as the storage device resets an invalid storage zone based on the block map information, the waste of the storage space may be minimized or reduced.

As described herein, any devices, electronic devises, modules, models, units, and/or portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphic processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

While the present inventive concepts have been described with reference to some example embodiments thereof, it will be apparent to those of ordinary skill in the art that various changes and modifications may be made thereto without departing from the spirit and scope of the present inventive concepts as set forth in the following claims.

What is claimed is:

1. A method of operating an electronic device including a host device and a storage device, the method comprising:

performing, by the host device, a validity check operation of a target host zone among a plurality of host zones supporting a sequential write operation;

generating, by the host device, block map information of the target host zone based on the validity check operation, the block map information including identification information of the target host zone and validity information of all data blocks in the target host zone;

sending, by the host device, the block map information to the storage device; and performing, by the storage device, an internal operation based on the block map information, wherein the storage device includes a plurality of storage zones, the target host zone is mapped to at least one storage zone among the plurality of storage zones, and the performing of the internal operation based on the block map information by the storage device includes managing, by the storage device, invalid data blocks among data blocks corresponding to the at least one storage zone as dummy data blocks based on the block map information.

2. The method of claim 1, wherein the identification information includes a host index value for identifying the target host zone among the plurality of host zones, and the validity information includes a series of validity values respectively corresponding to all the data blocks of the target host zone, each of the series of validity values indicating whether a corresponding data block of the target host zone is valid.

3. The method of claim 2, wherein each of the series of validity values includes a first bit value when the corresponding data block is valid; and a second bit value when the corresponding data block is invalid.

4. The method of claim 1, wherein the generating of the block map information of the target host zone based on the validity check operation by the host device includes determining, by the host device, whether at least some data blocks among all the data blocks of the target host zone are valid, based on the validity check operation; and generating, by the host device, the block map information of the target host zone in response to the determination that the at least some data blocks are valid based on the validity check operation.

5. The method of claim 4, further comprising: sending, by the host device, a reset request for the target host zone to the storage device, in response to a determination that all the data blocks of the target host zone are invalid based on the validity check operation.

6. The method of claim 1, wherein the generating of the block map information of the target host zone based on the validity check operation by the host device includes determining, by the host device, a number of invalid data blocks among all the data blocks of the target host zone based on the validity check operation; determining, by the host device, whether the number of the invalid data blocks exceeds a threshold value; and generating, by the host device, the block map information of the target host zone in response to the determination that the number of the invalid data blocks exceeds the threshold value.

7. The method of claim 1, wherein the internal operation includes at least one of a management operation of distribution information of at least one physical memory block mapped to the at least one storage zone; a reclaim operation according to a change of the distribution information of the at least one physical memory block; a wear-leveling operation of the at least one storage zone; and a garbage collection operation of the at least one storage zone.

8. The method of claim 1, wherein the storage device omits a management operation of distribution information of the dummy data blocks.

9. The method of claim 1, further comprising: identifying, by the storage device, an invalid storage zone among the plurality of storage zones, wherein all data blocks of the invalid storage zone are managed as dummy data blocks; and performing, by the storage device, a reset operation of the invalid storage zone to generate an empty storage zone.

10. The method of claim 9, further comprising: sending, by the host device, to the storage device an allocation request for another host zone among the plurality of host zones; and allocating, by the storage device, the empty storage zone to the another host zone based on the allocation request.

11. The method of claim 1, wherein the method further comprises before performing the validity check operation, sending, by the host device, to the storage device an allocation request of the target host zone; and allocating, by the storage device, the at least one storage zone among the plurality of storage zones to the target host zone based on the allocation request.

12. The method of claim 11, wherein the allocating of the at least one storage zone among the plurality of storage zones to the target host zone based on the allocation request by the storage device includes allocating, by the storage device, one storage zone among the plurality of storage zones to the target host zone based on the allocation request.

13. The method of claim 11, wherein the allocating of the at least one storage zone among the plurality of storage zones to the target host zone based on the allocation request by the storage device includes allocating, by the storage device, at least two storage zones among the plurality of storage zones to the target host zone based on the allocation request.

14. A method of operating a host device which communicates with a storage device, the method comprising: performing a validity check operation of a target host zone among a plurality of host zones supporting a sequential write operation; generating block map information of the target host zone based on the validity check operation, the block map information including identification information of the target host zone and validity information of all data blocks in the target host zone; and sending the block map information to the storage device, wherein the storage device includes a plurality of storage zones, the target host zone is mapped to at least one storage zone among the plurality of storage zones, and the storage device performs an internal operation based on the block map information, the internal operation including managing invalid data blocks among data blocks corresponding to the at least one storage zone as dummy data blocks based on the block map information.

15. The method of claim 14, wherein the generating of the block map information of the target host zone based on the validity check operation includes determining whether at least some data blocks among all the data blocks of the target host zone are valid, based on the validity check operation; and generating the block map information of the target host zone in response to the determination that the at least some data blocks are valid based on the validity check operation.

16. The method of claim 14, wherein the generating of the block map information of the target host zone based on the validity check operation includes determining a number of invalid data blocks among all the data blocks of the target host zone based on the validity check operation;

determining whether the number of the invalid data blocks exceeds a threshold value; and generating the block map information of the target host zone in response to the determination that the number of the invalid data blocks exceeds the threshold value.

17. A host device comprising:

a first processing circuitry configured to manage a plurality of host zones; and a second processing circuitry configured to send validity data information to the first processing circuitry based on a validity check operation of a target host zone among the plurality of host zones, the first processing circuitry configured to generate block map information of the target host zone based on the validity data information; and send the block map information to an external storage device, the block map information including identification information of the target host zone and validity information of all data blocks in the target host zone, wherein the external storage device includes a plurality of storage zones, the target host zone is mapped to at least one storage zone among the plurality of storage zones, and the external storage device is configured to perform an internal operation based on the block map information, the internal operation including managing invalid data blocks among data blocks corresponding to the at least one storage zone as dummy data blocks based on the block map information.

18. The host device of claim 17, wherein the identification information includes a host index value for identifying the target host zone among the plurality of host zones, and wherein the validity information includes a series of validity values respectively corresponding to all the data blocks of the target host zone, each of the series of validity values indicating whether a corresponding data block of the target host zone is valid.

* * * * *